US012214590B2

(12) United States Patent
Burkatovsky

(10) Patent No.: US 12,214,590 B2
(45) Date of Patent: *Feb. 4, 2025

(54) DIGITAL PRINTING SYSTEM WITH FLEXIBLE INTERMEDIATE TRANSFER MEMBER

(71) Applicant: LANDA CORPORATION LTD., Rehovot (IL)

(72) Inventor: Vitaly Burkatovsky, Rishon Lezion (IL)

(73) Assignee: LANDA CORPORATION LTD., Rehovot (IL)

( * ) Notice: Subject to any disclaimer, the term of this patent is extended or adjusted under 35 U.S.C. 154(b) by 122 days.

This patent is subject to a terminal disclaimer.

(21) Appl. No.: 18/076,420

(22) Filed: Dec. 7, 2022

(65) Prior Publication Data

US 2023/0166495 A1 Jun. 1, 2023

Related U.S. Application Data

(63) Continuation of application No. 17/221,817, filed on Apr. 4, 2021, now Pat. No. 11,548,275, which is a (Continued)

(51) Int. Cl.

*B41J 2/045* (2006.01)
*B41J 2/005* (2006.01)

(Continued)

(52) U.S. Cl.

CPC ......... *B41J 2/04508* (2013.01); *B41J 2/0057* (2013.01); *B41J 2/03* (2013.01);

(Continued)

(58) Field of Classification Search

CPC ..................................................... B41J 2/0057
See application file for complete search history.

(56) References Cited

U.S. PATENT DOCUMENTS

| | | | |
|---|---|---|---|
| 3,935,055 | A | 1/1976 | Carmien |
| 4,204,471 | A | 5/1980 | Becker |

(Continued)

FOREIGN PATENT DOCUMENTS

| | | | |
|---|---|---|---|
| CN | 1961015 | A | 5/2007 |
| CN | 101096455 | A | 1/2008 |

(Continued)

OTHER PUBLICATIONS

CN101096455A Machine Translation (EPO, PlatPat and Google) published on Jan. 2, 2008 Fujifilm Corp.

(Continued)

*Primary Examiner* — Shelby L Fidler
(74) *Attorney, Agent, or Firm* — Marc Van Dyke; Momentum IP

(57) ABSTRACT

Methods for printing using printing systems comprising a flexible intermediate transfer member (ITM) disposed around a plurality of guide rollers at which encoders are installed, and an image-forming station at which ink images are formed by droplet deposition by print bars onto the ITM, can include measuring a local velocity of the ITM under one of the print bars, determining a stretch factor for a portion of the ITM based on a relationship between an estimated stretched length fixed physical distance between print bars, controlling an ink deposition parameter according to the stretch factor so as to compensate for stretching of the reference portion of the ITM.

8 Claims, 11 Drawing Sheets

Related U.S. Application Data continuation of application No. 16/512,915, filed on Jul. 16, 2019, now Pat. No. 10,994,528.

(60) Provisional application No. 62/713,632, filed on Aug. 2, 2018.

(51) Int. Cl.
*B41J 2/03* (2006.01)
*B41J 2/155* (2006.01)
*B41J 2/01* (2006.01)

(52) U.S. Cl.
CPC ....... *B41J 2/04573* (2013.01); *B41J 2/04586* (2013.01); *B41J 2/155* (2013.01); *B41J 2002/012* (2013.01)

(56) References Cited

U.S. PATENT DOCUMENTS

| | | | |
|---|---|---|---|
| 4,520,048 A | 5/1985 | Ranger | |
| 4,792,473 A | 12/1988 | Vitale | |
| 4,867,830 A | 9/1989 | Chung | |
| 6,151,040 A | 11/2000 | Takada et al. | |
| 7,313,352 B2 | 12/2007 | Shinohara et al. | |
| 7,419,257 B2 | 9/2008 | Mouri et al. | |
| 7,583,920 B2 | 9/2009 | Willemsens et al. | |
| 8,632,147 B2 | 1/2014 | Onishi | |
| 9,044,932 B2 | 6/2015 | Ohnishi et al. | |
| 9,969,182 B2 | 5/2018 | Torisaka et al. | |
| 10,052,865 B2 | 8/2018 | Goto | |
| 10,336,060 B2 | 7/2019 | Liu | |
| 10,703,093 B2 | 7/2020 | Karlinski et al. | |
| 11,548,275 B2 | 1/2023 | Burkatovsky | |
| 11,890,879 B2 | 2/2024 | Landa et al. | |
| 2003/0103128 A1 | 6/2003 | Missell et al. | |
| 2004/0105971 A1 | 6/2004 | Parrinello et al. | |
| 2004/0126125 A1 * | 7/2004 | Yoda | G03G 15/5029 399/45 |
| 2004/0177779 A1 | 9/2004 | Steffen et al. | |
| 2004/0221943 A1 | 11/2004 | Yu et al. | |
| 2004/0249327 A1 | 12/2004 | Sendijarevic et al. | |
| 2005/0103437 A1 | 5/2005 | Carroll | |
| 2005/0117859 A1 | 6/2005 | Suzuki et al. | |
| 2006/0066704 A1 | 3/2006 | Nishida | |
| 2006/0127617 A1 | 6/2006 | Tanaka et al. | |
| 2007/0025740 A1 | 2/2007 | Katoh et al. | |
| 2008/0066277 A1 | 3/2008 | Colson et al. | |
| 2008/0247780 A1 | 10/2008 | Hara | |
| 2009/0073222 A1 | 3/2009 | Hori | |
| 2010/0035501 A1 | 2/2010 | Prudhomme et al. | |
| 2011/0069129 A1 | 3/2011 | Shimizu | |
| 2012/0014726 A1 | 1/2012 | Sekihara et al. | |
| 2012/0183756 A1 | 7/2012 | Higuchi | |
| 2012/0236100 A1 | 9/2012 | Toya | |
| 2012/0249630 A1 | 10/2012 | Bugner et al. | |
| 2013/0229457 A1 | 9/2013 | Yu | |
| 2014/0168313 A1 | 6/2014 | Ramesh et al. | |
| 2014/0176641 A1 | 6/2014 | Hawryschuk et al. | |
| 2015/0097906 A1 | 4/2015 | Beier et al. | |
| 2015/0273835 A1 | 10/2015 | Arimizu et al. | |
| 2015/0343797 A1 | 12/2015 | Song et al. | |
| 2015/0375543 A1 | 12/2015 | Barnett et al. | |
| 2016/0083609 A1 | 3/2016 | Sisler et al. | |
| 2016/0274519 A1 | 9/2016 | Lim et al. | |
| 2017/0275113 A1 | 9/2017 | Rietbergen et al. | |
| 2017/0282599 A1 | 10/2017 | Ido | |
| 2018/0178550 A1 | 6/2018 | Kremers et al. | |
| 2018/0335740 A1 | 11/2018 | Kishi et al. | |
| 2020/0073301 A1 | 3/2020 | Sakai et al. | |
| 2020/0361715 A1 | 11/2020 | Meier | |
| 2021/0055666 A1 | 2/2021 | Landa et al. | |
| 2022/0288947 A1 | 9/2022 | Landa et al. | |
| 2022/0357699 A1 | 11/2022 | Burkatovsky | |
| 2022/0379598 A1 | 12/2022 | Landa et al. | |
| 2022/0388315 A1 | 12/2022 | Landa et al. | |
| 2023/0001710 A1 | 1/2023 | Landa et al. | |
| 2023/0016492 A1 | 1/2023 | Landa et al. | |
| 2023/0037462 A1 | 2/2023 | Burkatovsky | |
| 2024/0176275 A1 | 5/2024 | Burkatovsky | |

FOREIGN PATENT DOCUMENTS

| | | | | |
|---|---|---|---|---|
| CN | 101248146 A | 8/2008 | | |
| CN | 101433074 A | 5/2009 | | |
| CN | 102341249 A | 2/2012 | | |
| CN | 102566343 A | 7/2012 | | |
| CN | 105844621 A | 8/2016 | | |
| CN | 107879147 A | 4/2018 | | |
| DE | 102012011783 A1 | 12/2013 | | |
| JP | 48043941 | 12/1973 | | |
| JP | S63274572 A | 11/1988 | | |
| JP | H05212851 A | 8/1993 | | |
| JP | H05249870 A | 9/1993 | | |
| JP | H05301339 A | 11/1993 | | |
| JP | H08272224 A | 10/1996 | | |
| JP | H09174646 A | 7/1997 | | |
| JP | H10130597 A | 5/1998 | | |
| JP | 2000094660 A | 4/2000 | | |
| JP | 2000141883 A | 5/2000 | | |
| JP | 2000190468 A | 7/2000 | | |
| JP | 2000337464 A | 12/2000 | | |
| JP | 2003107819 A | 4/2003 | | |
| JP | 2003227549 A | 8/2003 | | |
| JP | 2004117118 A | 4/2004 | | |
| JP | 2005224737 A | 8/2005 | | |
| JP | 2005266246 A | 9/2005 | | |
| JP | 2006154289 A | 6/2006 | | |
| JP | 2006256087 A | 9/2006 | | |
| JP | 2008248437 A | 10/2008 | | |
| JP | 2009154377 A | 7/2009 | | |
| JP | 2009227909 A | 10/2009 | | |
| JP | 2009258587 A | 11/2009 | | |
| JP | 2009271422 A | 11/2009 | | |
| JP | 2009279808 A | 12/2009 | | |
| JP | 2011168024 A | 9/2011 | | |
| JP | 2013104044 A | 5/2013 | | |
| JP | 2013249548 A | 12/2013 | | |
| JP | 2014008609 A | 1/2014 | | |
| JP | 2014073675 A | 4/2014 | | |
| JP | 2015202616 A | 11/2015 | | |
| JP | 2016074206 A | 5/2016 | | |
| JP | 2016179678 A | 10/2016 | | |
| JP | 2017072776 A | 4/2017 | | |
| JP | 2017093178 A | 5/2017 | | |
| JP | 2017167498 A | 9/2017 | | |
| JP | 2018017429 A | 2/2018 | | |
| JP | 2018084617 A | 5/2018 | | |
| JP | 2018150660 A | 9/2018 | | |
| JP | 2018194654 A | 12/2018 | | |
| JP | 2019523719 A | 8/2019 | | |
| JP | 2020014350 A | 1/2020 | | |
| JP | 2021529110 A | 10/2021 | | |
| WO | WO-02099540 A1 * | 12/2002 | ......... | G03G 15/1605 |
| WO | 2015026864 A1 | 2/2015 | | |
| WO | 2015036865 A1 | 3/2015 | | |
| WO | 2017208144 A1 | 12/2017 | | |
| WO | 2017208152 A1 | 12/2017 | | |
| WO | 2019012456 A1 | 1/2019 | | |
| WO | 2019111223 A1 | 6/2019 | | |
| WO | 2020003088 A1 | 1/2020 | | |
| WO | 2020035766 A1 | 2/2020 | | |
| WO | 2020136517 A1 | 7/2020 | | |
| WO | 2020141465 A1 | 7/2020 | | |
| WO | 2021137063 A1 | 7/2021 | | |

OTHER PUBLICATIONS

CN101248146A Machine Translation (EPO, PlatPat and Google) published on Aug. 20, 2008 Ricoh KK.
CN101433074A Machine Translation (by EPO and Google)—published May 13, 2009; Kyocera Mita Corp [JP].
CN102341249A Machine Translation (EPO, PlatPat and Google) published on Feb. 1, 2012 Eastman Kodak Co.

(56) References Cited

OTHER PUBLICATIONS

CN102566343A Machine Translation (by EPO and Google)—published Jul. 11, 2012; Canon KK.
CN105844621A Machine Translation (by EPO and Google)—published Aug. 10, 2016; Fuyang Feiyang Printing Co Ltd.
CN107879147A Machine Translation (by EPO and Google)—published Apr. 6, 2018; Brother Ind Ltd.
CN1961015A Machine Translation (EPO, PlatPat and Google) published on May 9, 2007 Dainippon Ink & Chemicals.
Co-pending U.S. Appl. No. 18/016,343, inventors Levanon; Moshe et al., filed Jan. 15, 2023.
Co-pending U.S. Appl. No. 18/069,232, filed Dec. 21, 2022.
Co-pending U.S. Appl. No. 18/083,532, inventors Landa; Benzion et al., filed Dec. 18, 2022.
IP.com search (Year: 2022).
JP2000094660A Machine Translation (by EPO and Google)—published Apr. 4, 2000; Brother Ind Ltd.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother Ind Ltd.
JP2000337464A Machine Translation (by EPO and Google)—published Dec. 5, 2000; Fuji Xerox Co Ltd.
JP2003107819A Machine Translation (by EPO and Google)—published Apr. 9, 2003; Kanegafuchi Chemical Ind.
JP2003227549A Machine Translation (by EPO, PlatPat and Google)—published Aug. 15, 2003; Xerox Corp.
JP2004117118A Machine Translation (by EPO and Google)—published Apr. 15, 2004; Nidec Copal Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006; Ricoh Printing Sys Ltd.
JP2009154377A Machine Translation (by EPO and Google)—published Jul. 16, 2009; Fujifilm Corp.
JP2009227909A Machine Translation (EPO, PlatPat and Google) published on Oct. 8, 2009 Fujifilm Corp.
JP2009258587A Machine Translation (by EPO and Google)—published Nov. 5, 2009; Fuji Xerox Co Ltd.
JP2009271422A Machine Translation (by EPO and Google)—published Nov. 19, 2009; Ricoh KK.
JP2009279808A Machine Translation (by EPO and Google)—published Dec. 3, 2009; Fuji Xerox Co Ltd.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016179678A Machine Translation (EPO, PlatPat and Google) published on Oct. 13, 2016 Xerox Corp.
JP2017093178A Machine Translation (EPO and Google) published on May 25, 2017 Samsung Electronics Co Ltd.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JP48043941 Machine Translation (by EPO and Google)—published Dec. 21, 1973.
JPH05249870A Machine Translation (by EPO, PlatPat and Google)—published Sep. 28, 1993; Matsushita Electric Ind Co Ltd.
JPH09174646A Machine Translation (by EPO and Google)—published Jul. 8, 1997; Kao Corp.
JPH10130597A Machine Translation (by EPO and Google)—published May 19, 1998; Sekisui Chemical Co Ltd.
JPS63274572A Machine Translation (by EPO and Google)—published Nov. 11, 1988; Canon KK.
Co-pending U.S. Appl. No. 18/207,180, inventor Landa; Benzion, filed Jun. 8, 2023.
Co-pending U.S. Appl. No. 18/492,815, filed Oct. 24, 2023.
DE102012011783A1 Machine Translation (by EPO, PlatPat and Google)—published Dec. 19, 2013; Heidelberger Druckmasch AG.
JP2006154289A Machine Translation (by EPO and Google)—published Jun. 15, 2006; Ricoh KK.
JP2008248437A Machine Translation (by EPO and Google)—published Oct. 16, 2008; Seiren Co Ltd.
JP2017072776A Machine Translation (by EPO and Google)—published Apr. 13, 2017; Oki Data KK.
JP2017167498A Machine Translation (by EPO and Google)—published Sep. 21, 2017; Ricoh Co Ltd.
JP2018084617A Machine Translation (by EPO and Google)—published May 31, 2018; Ricoh Co Ltd.
JP2018150660A Machine Translation (by EPO and Google)—published Sep. 27, 2018; Seiren Co Ltd.
JPH05212851A Machine Translation (by EPO and Google)—published Aug. 24, 1993; Kanebo Ltd et al.
JPH08272224A Machine Translation (by EPO, PlatPat and Google)—published Oct. 18, 1996; Ricoh KK.
OSRAM Opto Semiconductors GmbH, "SFH 206 K—Radial Sidelooker—Silicon PIN Photodiode", Datasheet, Jan. 7, 2020, Version 1.4, pp. 1-14.
SIEMENS Semiconductor Group, "Silizium-PIN-Fotodiode—SFH 206 K," Datasheet, Mar. 17, 1998, pp. 1-4.
VISHAY Intertechnology, Inc., "Power SMD LED LCC-2 Plus", Datasheet, year 2017, pp. 1-9.
JP2005266246A Machine Translation (by EPO and Google)—published Sep. 29, 2005; Ricoh KK.
JP2013249548A Machine Translation (by EPO and Google)—published Dec. 12, 2013; Seiko Epson Corp.
JP2018194654A Machine Translation (by EPO and Google)—published Dec. 6, 2018; Seiko Epson Corp.
JP2021529110A Machine Translation (by EPO and Google)—published Oct. 28, 2021; Randa Corporation Limited.
JPH05301339A Machine Translation (by EPO and Google)—published Nov. 16, 1993; Canon KK.

* cited by examiner

RELATIONSHIP OF $X_{EST}(TT)_j$ AND $X_{EST}(TT)_{j+1}$ TO $X_{FIX}$
$X_{EST}(TT)_j$ IS CALCULATED FROM $V_j$
$X_{EST}(TT)_{j+1}$ IS CALCULATED FROM $V_{j+1}$

SEGMENT LENGTHS CALCULATED FROM LOCAL VELOCITIES MEASURED DURING EACH TIME INTERVAL $TI_i$ $X_{SEG}(TI_i)_j$ IS CALCULATED FROM $V_j$ $X_{SEG}(TI_i)_{j+1}$ IS CALCULATED FROM $V_{j+1}$

SEGMENT LENGTHS $X_{SEG}(TI_1)$ .. $X_{SEG}(TI_M)$ CALCULATED FROM LOCAL VELOCITY MEASUREMENTS FOR THE IMMEDIATELY PRECEDING $M$ TIME INTERVALS $TI_1$ .. $TI_M$ ARE SUMMED TO OBTAIN A TIME-INTERVAL-SPECIFIC STRETCHED LENGTH ESTIMATE $X_{EST}(TI_i)$ [CAN BE PERFORMED AT UPSTREAM OR DOWNSTREAM ROLLER]

DIGITAL PRINTING SYSTEM WITH FLEXIBLE INTERMEDIATE TRANSFER MEMBER

CROSS-REFERENCE TO RELATED APPLICATIONS

This patent application claims the benefit of U.S. Provisional Patent Application No. 62/713,632 filed on Aug. 2, 2018, which is incorporated herein by reference in its entirety.

FIELD OF THE INVENTION

The present invention relates to systems and methods for controlling various aspects of a digital printing system that uses an intermediate transfer member. In particular, the present invention is suitable for printing systems in which images are formed by the deposition of ink droplets by multiple print bars, and in which it is desirable to adjust the spacing between ink droplets, in response to longitudinal stretching of the intermediate transfer member.

BACKGROUND

Various printing devices use an inkjet printing process, in which an ink is jetted to form an image onto the surface of an intermediate transfer member (ITM), which is then used to transfer the image onto a substrate. The ITM may be a flexible belt guided over rollers. The flexibility of the belt can cause a portion of the belt to become stretched longitudinally, and especially in the area of an image forming station wherein a drive roller that is downstream of the image-forming station can impart a higher velocity to the belt than an upstream drive roller, i.e., a drive roller that is upstream of the image-forming station. This difference in velocity at the drive rollers keeps a portion of the belt taut as it passes the print bars of the image-forming station. In some cases the tautness-making can lead to the aforementioned stretching. The terms 'longitudinally', 'upstream' and 'downstream' are used herein relative to the print direction, i.e., the travel direction of ink images formed upon the belt.

The portion of the belt that was stretched between the upstream and downstream drive rollers may become unstretched after passing the downstream drive roller, or stretched to a lesser degree, and when images are transferred from the belt to substrate at an impression station, inter-droplet spacing of an image may be different than it was at the time that the image was formed at the image-forming station. In other words, a stretch factor characterizing an extent of stretching at the impression station will often be different from a stretch factor characterizing an extent of stretching at the image-forming station. It is, therefore, necessary to compensate for the different stretching factors.

The following co-pending patent publications provide background material, and are all incorporated herein by reference in their entirety: WO/2017/009722 (publication of PCT/IB2016/053049 filed May 25, 2016), WO/2016/166690 (publication of PCT/IB2016/052120 filed Apr. 4, 2016), WO/2016/151462 (publication of PCT/IB2016/051560 filed Mar. 20, 2016), WO/2016/113698 (publication of PCT/IB2016/050170 filed Jan. 14, 2016), WO/2015/110988 (publication of PCT/IB2015/050501 filed Jan. 22, 2015), WO/2015/036812 (publication of PCT/IB2013/002571 filed Sep. 12, 2013), WO/2015/036864 (publication of PCT/IB2014/002366 filed Sep. 11, 2014), WO/2015/036865 (publication of PCT/IB2014/002395 filed Sep. 11, 2014), WO/2015/036906 (publication of PCT/IB2014/064277 filed Sep. 12, 2014), WO/2013/136220 (publication of PCT/IB2013/051719 filed Mar. 5, 2013), WO/2013/132419 (publication of PCT/IB2013/051717 filed Mar. 5, 2013), WO/2013/132424 (publication of PCT/IB2013/051727 filed Mar. 5, 2013), WO/2013/132420 (publication of PCT/IB2013/051718 filed Mar. 5, 2013), WO/2013/132439 (publication of PCT/IB2013/051755 filed Mar. 5, 2013), WO/2013/132438 (publication of PCT/IB2013/051751 filed Mar. 5, 2013), WO/2013/132418 (publication of PCT/IB2013/051716 filed Mar. 5, 2013), WO/2013/132356 (publication of PCT/IB2013/050245 filed Jan. 10, 2013), WO/2013/132345 (publication of PCT/IB2013/000840 filed Mar. 5, 2013), WO/2013/132339 (publication of PCT/IB2013/000757 filed Mar. 5, 2013), WO/2013/132343 (publication of PCT/IB2013/000822 filed Mar. 5, 2013), WO/2013/132340 (publication of PCT/IB2013/000782 filed Mar. 5, 2013), and WO/2013/132432 (publication of PCT/IB2013/051743 filed Mar. 5, 2013).

SUMMARY

A method of printing is disclosed according to embodiments. The method uses a printing system that comprises (i) a flexible intermediate transfer member (ITM) disposed around a plurality of guide rollers including an upstream guide roller and a downstream guide roller, at which respective upstream and downstream encoders are installed, and (ii) an image-forming station at which ink images are formed by droplet deposition, the image-forming station comprising an upstream print bar and a downstream print bar, the upstream and downstream print bars being disposed over the ITM and respectively aligned with the upstream and downstream guide rollers, the upstream and downstream print bars defining a reference portion RF of the ITM. The method comprises (a) measuring a local velocity V of the ITM under at least one of the upstream and downstream print bars at least once during each time interval $TI_i$, each time interval $TI_i$ being one of M consecutive preset divisions of a predetermined time period TT, where M is a positive integer; (b) determining a respective time-interval-specific stretch factor $SF(TI_i)$ for the reference portion RF, based on a mathematical relationship between a time-interval-specific stretched length $X_{EST}(TI_i)$ and a fixed physical distance $X_{FIX}$ between the upstream and downstream print bars; and (c) controlling an ink deposition parameter of the downstream print bar according to the determined time-interval-specific stretch factor $SF(TI_i)$, so as to compensate for stretching of the reference portion of the ITM.

In some embodiments, the time-interval-specific stretched length $X_{EST}(TI_i)$ can be obtained by summing, for the immediately preceding M time intervals $TI_i$, respective segment-lengths $X_{SEG}(TI_i)$ calculated from the local velocities V measured during each time interval $TI_i$, wherein the calculating includes the use of at least one of a summation, a product, and an integral.

In some embodiments, the ink deposition parameter can be a spacing between respective ink droplets deposited by upstream and downstream print bars onto the ITM.

In some embodiments, it can be that every time interval $TI_i$ is one Mth of the predetermined time period TT. In some embodiments, the predetermined time period TT can be a measured travel time of a portion of the ITM from the upstream print bar to the downstream print bar. The portion of the ITM can be the reference portion RF of the ITM.

In some embodiments, M can equal 1. In some embodiments, M can be greater than 1 and not greater than 10. In some embodiments, M can be greater than 10 and not greater than 1,000.

A method of printing is disclosed, according to embodiments. The method uses a printing system that comprises (i) an image-forming station at which ink images are formed by droplet deposition on a rotating flexible intermediate transfer member (ITM), and (ii) an impression station downstream of the image-forming station at which the ink images are transferred to substrate. The method comprises (a) tracking a stretch-factor ratio between a first measured or estimated local stretch factor of the ITM at the image-forming station and a second measured or estimated local stretch factor of the ITM at the impression station; and (b) in response to and in accordance with detected changes in the tracked stretch factor ratio, controlling deposition of droplets onto the ITM at the imaging station so as to modify a spacing between ink droplets in ink images formed on the ITM at the imaging station.

In some embodiments, the method can additionally comprise the steps of (a) transporting the ink images formed on the ITM at the imaging station to the impression station; and (b) transferring the ink images to substrate at the impression station, such that a spacing between ink droplets in ink images when transferred to substrate at the impression station is different than the spacing between the respective ink droplets when the ink images were formed at the image-forming station. The spacing between ink droplets in ink images when transferred to substrate at the impression station can be smaller than the spacing between the respective ink droplets when the ink images were formed at the image-forming station.

In some embodiments, it can be that (i) the image-forming station of the printing system comprises a plurality of print bars, and (ii) the tracking a stretch-factor ratio between a measured or estimated local stretch factor of the ITM at the image-forming station and a measured or estimated local stretch factor of the ITM at the impression station includes tracking a respective stretch-factor ratio between a measured or estimated local stretch factor of the ITM at each print bar of the image-forming station and a measured or estimated local stretch factor of the ITM at the impression station.

A method of printing is disclosed, according to embodiments. The method uses a printing system that comprises (i) an image-forming station at which ink images are formed by droplet deposition on a rotating flexible intermediate transfer member (ITM), and (ii) an impression station downstream of the image-forming station at which the ink images are transferred to substrate. The method comprises (a) tracking a first ITM stretch factor at the image-forming station and a second ITM stretch factor at the impression station, the second ITM stretch factor being different than the first ITM stretch factor; (b) forming the ink images at the image-forming station with a droplet-to-droplet spacing according to the first ITM stretch factor; and (c) transferring the ink images to substrate at the impression station with a droplet-to-droplet spacing according to the second ITM stretch factor.

In some embodiments, the second stretch factor can be smaller than the first ITM stretch factor.

In some embodiments, it can be that (i) the image-forming station of the printing system comprises a plurality of print bars, (ii) tracking a first ITM stretch factor at the image-forming station includes tracking a respective first ITM stretch factor at each print bar of the image-forming station, and (iii) forming the ink images at the image-forming station with a droplet-to-droplet spacing according to the first ITM stretch factor includes forming the ink images at each print bar of the image-forming station with a droplet-to-droplet spacing according to the first ITM stretch factor corresponding to the respective print bar.

A method of printing an image is disclosed, according to embodiments. The method uses a printing system that comprises (i) an intermediate transfer member (ITM) comprising a flexible endless belt mounted over a plurality of guide rollers, (ii) an image-forming station comprising a print bar disposed over a surface of the ITM, the print bar configured to form ink images upon a surface of the ITM by droplet deposition, and (iii) a conveyer for driving rotation of the ITM in a print direction to transport the ink images towards an impression station where they are transferred to substrate. The method comprises (a) depositing ink droplets, by the print bar, so as to form an ink image on the ITM with at least a part of the ink image characterized by a first between-droplet spacing in the print direction; (b) transporting the ink image, by the ITM, to the impression station; and (c) transferring the ink image to substrate at the impression station with a second between-droplet spacing in the print direction, wherein the first between-droplet spacing in the print direction is in accordance with data associated with stretching of the ITM at the print bar.

In some embodiments, the second between-droplet spacing can be smaller than the first between-droplet spacing. In some embodiments the first between-droplet spacing in the print direction can change from time to time.

In embodiments, a printing system comprises (a) a flexible intermediate transfer member (ITM) disposed around a plurality of guide rollers including upstream and downstream guide rollers at which upstream and downstream encoders are respectively installed; (b) an image-forming station at which ink images are formed by droplet deposition, the image-forming station comprising an upstream print bar and a downstream print bar, the upstream and downstream print bars disposed over the ITM and respectively aligned with the upstream and downstream guide rollers, the upstream and downstream print bars (i) having a fixed physical distance $X_{FIX}$ therebetween and (ii) defining a reference portion RF of the ITM; and (c) electronic circuitry for controlling a spacing between respective ink droplets deposited by the upstream and downstream print bars onto the ITM and other ink droplets according to a calculated time-interval-specific stretch factor $SF(TI_i)$ so as to compensate for stretching of the reference portion RF of the ITM, wherein (i) a time-interval-specific stretch factor $SF(TI_i)$ for each time interval $TI_i$ is based on a mathematical relationship between an estimated time-interval-specific stretched length $X_{EST}(TI_i)$ and fixed physical distance $X_{FIX}$, the time-interval-specific stretched length $X_{EST}(TI_i)$ being the sum of M segment-lengths $X_{SEG}(TI_i)$ corresponding to local velocities V measured under at least one of the upstream and downstream print bars at least once during each respective time interval $TI_i$, and (ii) each respective time interval $TI_i$ is one of M consecutive preset divisions of a predetermined time period TT, M being a positive integer.

In embodiments, a printing system comprises (a) an image-forming station at which ink images are formed by droplet deposition on a rotating flexible intermediate transfer member (ITM); (b) an impression station downstream of the image-forming station, at which the ink images are transferred to substrate; and (c) electronic circuitry configured to track a stretch-factor ratio between a measured or estimated local stretch factor of the ITM at the image-forming station and a measured or estimated local stretch factor of the ITM at the impression station, and, in response to and in accordance with detected changes in the tracked stretch factor ratio, control deposition of droplets onto the ITM at the imaging station so as to modify a spacing between ink droplets in ink images formed on the ITM at the imaging station.

In some embodiments, the electronic circuitry can be configured such that modifying of a spacing between ink droplets in ink images formed on the ITM at the imaging station is such that the spacing between ink droplets in ink images formed on the ITM is larger than a spacing between the droplets in the ink images when transferred to substrate at the impression station.

In embodiments, a printing system comprises (a) an image-forming station at which ink images are formed by droplet deposition on a rotating flexible intermediate transfer member (ITM); (b) electronic circuitry configured to track a first ITM stretch factor at the image-forming station and a second ITM stretch factor at an impression station downstream of the image-forming station at which the ink images are transferred to substrate, and to control deposition of droplets onto the ITM at the imaging station so as to modify a spacing between ink droplets in accordance with the first ITM stretch factor; and (c) the impression station, at which the ink images are transferred to substrate with a spacing between ink droplets in accordance with the second stretch factor.

In some embodiments, the second stretch factor can be smaller than the first ITM stretch factor.

In embodiments, a printing system comprises (a) an intermediate transfer member (ITM) comprising a flexible endless belt mounted over a plurality of guide rollers and rotating in a print direction; (b) an image-forming station comprising a print bar disposed over a surface of the ITM, the print bar configured to deposit droplets upon a surface of the ITM so as to form ink images characterized at least in part by a first between-droplet spacing in the print direction which is selected in accordance with in accordance with data associated with stretching of the ITM at the print bar; and (c) a conveyer for driving rotation of the ITM in a print direction to transport the ink images towards an impression station where they are transferred to substrate with a second between-droplet spacing in the print direction.

In some embodiments, the second between-droplet spacing can be smaller than the first between-droplet spacing.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE EMBODIMENTS

Figure 1:
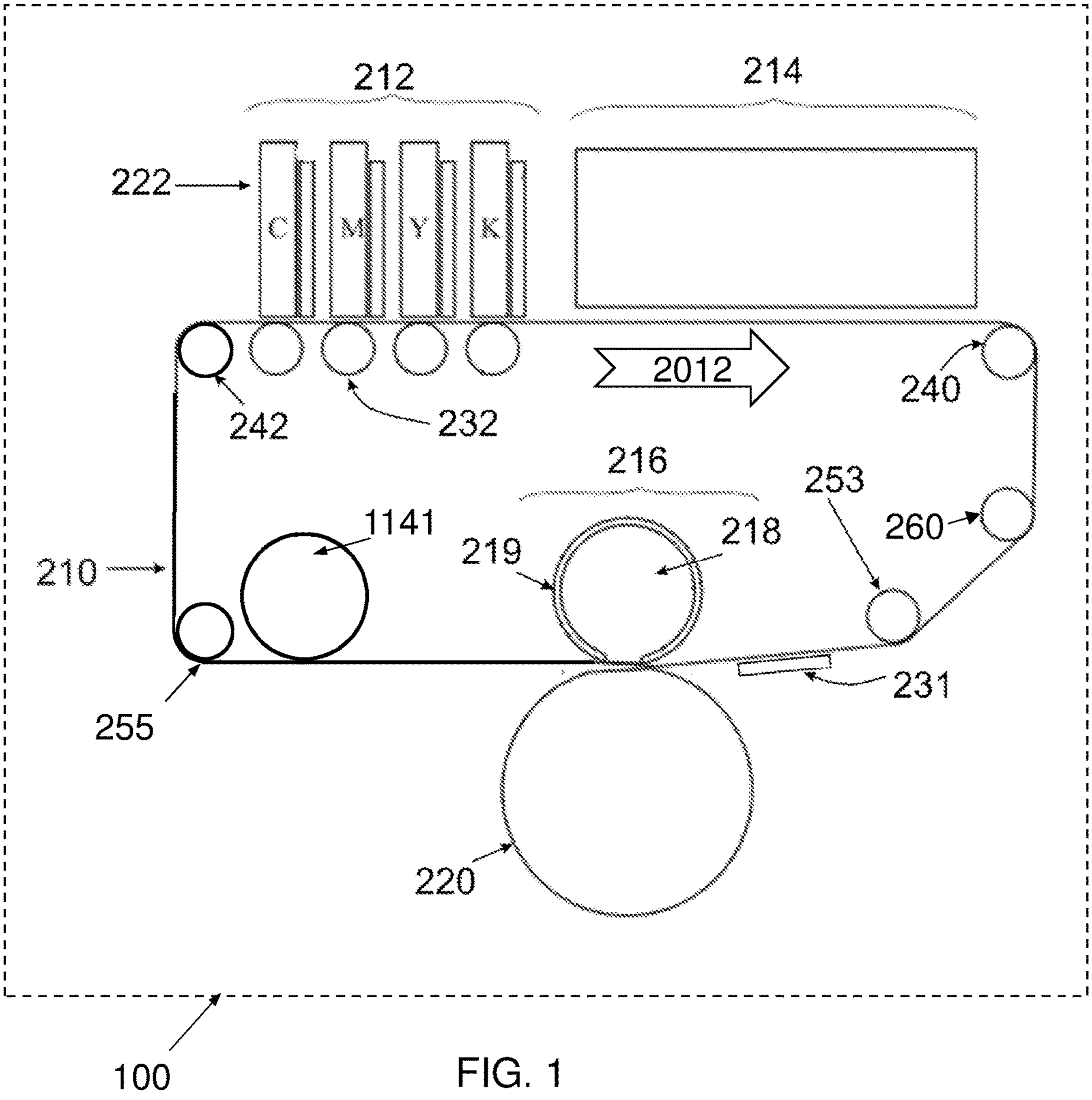
FIGS. 1 and 2 are schematic elevation-view illustrations of printing systems according to embodiments.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements. Subscripted reference numbers (e.g., $10_1$) or letter-modified reference numbers (e.g., 100a) may be used to designate multiple separate appearances of elements in a single drawing, e.g. $10_1$ is a single appearance (out of a plurality of appearances) of element 10, and likewise 100a is a single appearance (out of a plurality of appearances) of element 100.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

A "controller" or, alternately, "electronic circuitry", as used herein is intended to describe any processor, or computer comprising one or more processors, configured to control one or more aspects of the operation of a printing system or of one or more printing system components according to program instructions that can include rules, machine-learned rules, algorithms and/or heuristics, the programming methods of which are not relevant to this invention. A controller can be a stand-alone controller with a single function as described, or alternatively can combine more than one control function according to the embodiments herein and/or one or more control functions not related to the present invention or not disclosed herein. For example, a single controller may be provided for controlling all aspects of the operation of a printing system, the control functions described herein being one aspect of the control functions of such a controller. Similarly, the functions disclosed herein with respect to a controller can be split or distributed among more than one computer or processor, in which case any such plurality of computers or processors are to be construed as being equivalent to a single computer or processor for the purposes of this definition. For purposes of clarity, some components associated with computer networks, such as, for example, communications equipment and data storage equipment, have been omitted in this specification but a skilled practitioner will understand that a controller as used herein can include any network gear or ancillary equipment necessary for carrying out the functions described herein.

In various embodiments, an ink image is first deposited on a surface of an intermediate transfer member (ITM), and transferred from the surface of the intermediate transfer member to a substrate (i.e. sheet substrate or web substrate). For the present disclosure, the terms "intermediate transfer member", "image transfer member" and "ITM" are synonymous and may be used interchangeably. The location at which the ink is deposited on the ITM is referred to as the "image forming station". In many embodiments, the ITM comprises a "belt" or "endless belt" or "blanket" and these terms may be used interchangeably with ITM. The area or region of the printing press at which the ink image is transferred to substrate is an "impression station". It is appreciated that for some printing systems, there may be a plurality of impression stations.

The terms 'longitudinally' and 'longitudinal' refer to a direction that is parallel to the direction of travel of an intermediate transfer member (ITM) in a printing system.

Referring now to the figures, FIG. 1 is a schematic diagram of a printing system 100 according to embodiments of the present invention. The printing system 100 of FIG. 1 comprises an intermediate transfer member (ITM) 210 comprising a flexible endless belt mounted over a plurality of rollers 232 (232$_1$ . . . 232$_N$), 240, 260, 253, 255, 242. Some of the rollers may be drive rollers activated by an electric motor, and others may be passive guide rollers. FIG. 1 shows aspects of a specific configuration relevant to discussion of the invention, and the shown configuration is not limited to the presented number and disposition of the rollers, nor is it limited to the shape and relative dimensions, all of which are shown here for convenience of illustrating the system components in a clear manner.

In the example of FIG. 1, the ITM 210 rotates in the clockwise direction relative to the drawing. The direction of belt movement, which is also called the "print direction" as it's the direction of circumferential travel from an image-processing station 212 towards an impression station 216, defines upstream and downstream directions. The print direction is shown in FIG. 1 by arrow 2012, and in FIG. 2 by arrow 150. Regardless of whether a print direction is illustrated in any particular figure, the convention throughout all figures in this disclosure is that print direction is to be understood as being clockwise in any figure or portion thereof wherein an entire ITM or printing system is shown, as left-to-right wherever an upper run of an ITM or other printing system components are shown, and right-to-left where a bottom run of a printing system is shown. Obviously, this is just a convention to achieve a consistency that aids ease of understanding the disclosure, and even the same printing system, if illustrated 'from the other side', would show the reverse direction of travel.

Rollers 242, 240 are respectively positioned upstream and downstream of the image forming station 212—thus, roller 242 may be referred to as a "upstream roller" while roller 240 may be referred to as a "downstream roller". In some embodiments, downstream roller 240 can be a "drive roller", i.e., a roller that drives the rotation of the ITM 210 because it is engaged with a motor or other conveying mechanism. Upstream roller 242 can also be a drive roller. In other embodiments these two rollers can be unpowered guide rollers, i.e., guide rollers are rollers which rotate with the passage thereupon (or therearound) of the ITM 210 and don't accelerate or regulate the velocity of the ITM 210. Any one or more of the other rollers 232, 260, 253, 255 can be drive rollers or guide rollers depending on system design. For any two rollers, it is possible to view one as a downstream roller and one as an upstream roller, according to the direction of travel of the ITM 210 (e.g., the print direction 1200).

In FIG. 1, the illustrated printing system 100 further comprises the following elements:

(a) the image forming station 212 mentioned earlier, which comprises, for example, print bars 222 (respectively 222$_1$, 222$_2$, 222$_3$ and 222$_4$) each noted in the figure as one of C, M Y and K—for cyan, magenta, yellow and black. The image forming station 212 is configured to form ink images (NOT SHOWN) upon a surface of the ITM 210 (e.g., by droplet deposition thereon).

(b) a drying station 214 for drying the ink images.

(c) the impression station 216, also mentioned earlier, where the ink images are transferred from the surface of the ITM 210 to sheet 231 or web substrate (only sheet substrate is illustrated in FIG. 1).

In the particular non-limiting example of FIG. 1, the impression station 216 comprises an impression cylinder 220 and a blanket/pressure cylinder 218 that carries a compressible layer 219.

The skilled artisan will appreciate that not every component illustrated in FIG. 1 is required, and that a complex digital printing system such as that illustrated in FIG. 1 can comprise additional components which are not shown because they are not relevant to the present disclosure.

Figure 2:
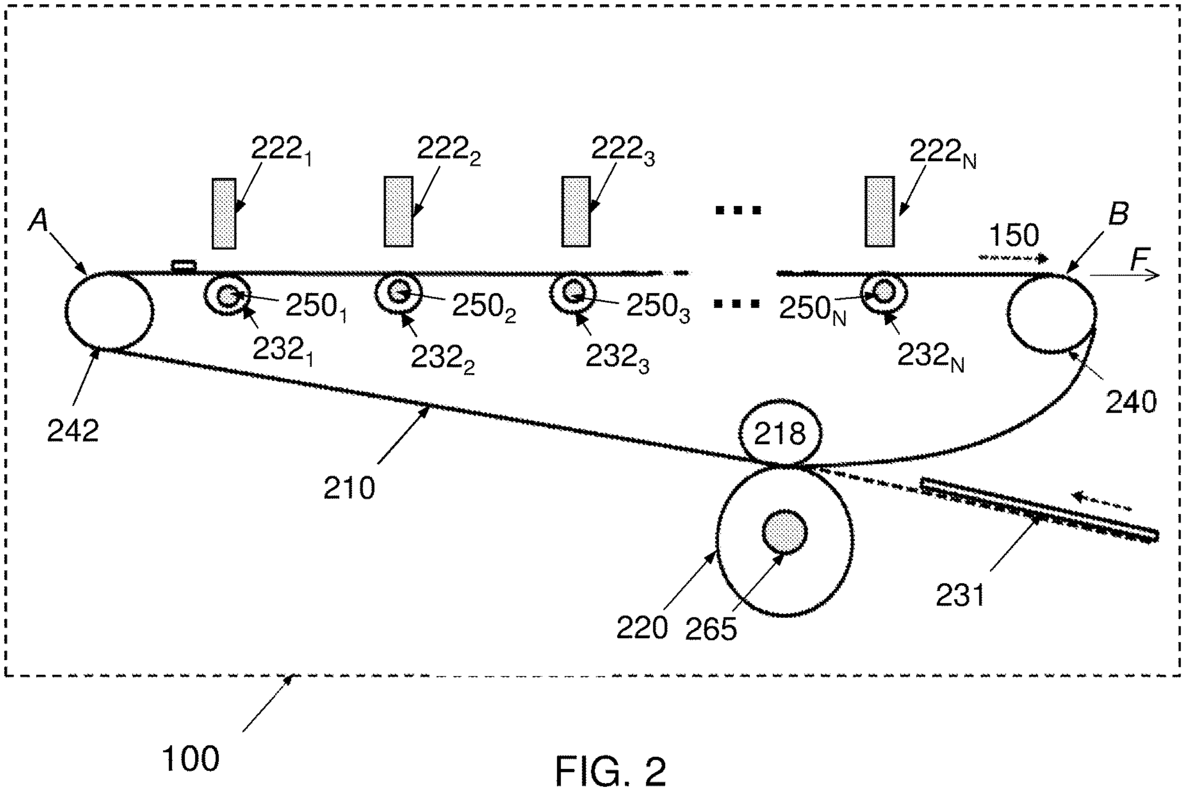
Figure 3A:
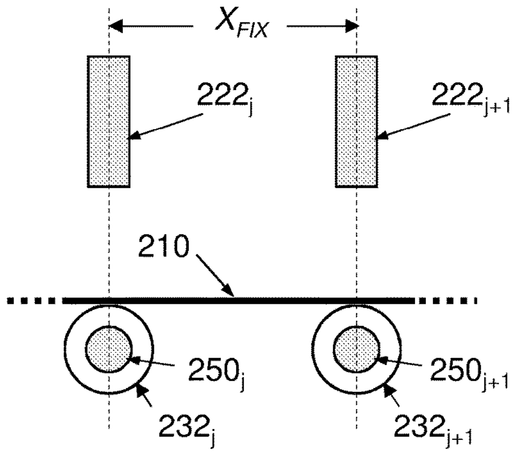
FIGS. 3A, 3B, 4A and 4B are schematic elevation-view illustrations of print bar and guide roller components of a printing system, according to embodiments.
Figure 3B:
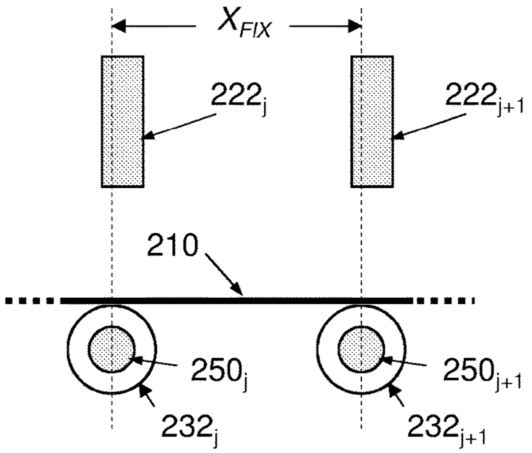

FIG. 2 illustrates, schematically, another non-limiting example of a printing system 100 according to embodiments. Print bars 222$_1$ . . . 222$_N$ are disposed above a surface of the ITM 210. Each respective one of guide rollers 232$_1$ . . . 232$_N$ is 'aligned' with a corresponding one of print bars 222$_1$ . . . 222$_N$. For the purposes of this disclosure, 'corresponding' means that, by way of example, guide roller 232$_1$ corresponds to print bar 222$_1$, guide roller 232$_2$ corresponds to print bar 222$_2$, and so on. Each guide roller 232 comprises an encoder 250, i.e., a respective one of encoders 250$_1$ . . . 250$_N$. An encoder, as in the example illustrated in FIG. 2, can be a rotary encoder. A rotary encoder, as is known in the art, can be used, inter alia, for measuring rotational speed, and for communicating the rotational speed to a controller (not shown in FIG. 2) for recordation and/or for further data processing). Although not shown in FIG. 2, each drive roller 240, 242 may also include an encoder. What is meant by 'aligned' is that the placement of each print bar 222 relative to a corresponding guide roller 232 (or, alternatively, the placement of each guide roller 232 relative to a corresponding each print bar 222) is based on a pre-determined and fixed spatial relationship. For example, as illustrated in FIG. 3A, each of neighboring print bars 222$_j$ or 222$_{j+1}$ (two of the print bars 222$_1$ . . . 222$_N$) is aligned centerline-to-centerline above respective guide roller 232$_j$ or 232$_{j+1}$. The fixed physical distance between the print bars on a horizontal plane, centerline-to-centerline, is shown in FIG. 3A as $X_{FIX}$. In some embodiments the fixed physical distance between each two neighboring print bars 222 of all the print bars 222$_1$ . . . 222$_N$ can be the same $X_{FIX}$, and in other embodiments (not shown) there can be a different fixed physical distance $X_{FIXj,j+1}$ between each pair of neighboring print bars 222$j$, $222_{j+1}$ for each print bar $222_j$. The alignment of print bars with corresponding guide rollers is not necessarily centerline-to-centerline: FIG. 3B illustrates a non-limiting example in which the vertical alignment is such that the actual centerline of each guide roller 232, if extended vertically, would pass somewhat left of a vertical centerline of each corresponding print bar 222. Obviously, the vertically-extended centerline of each guide roller could pass somewhat right of the vertical centerline, or might even not pass through the print bar but instead adjacent to it. In any of these cases, as exemplified in FIG. 3B, the horizontal distance from print bar $222_j$ to print bar $222_{j+1}$ is still defined by a fixed physical distance $X_{FIX}$, and once again it is noted that in some embodiments the fixed physical distance between each two neighboring print bars 222 of all the print bars $222_1 \ldots 222_N$ can be the same $X_{FIX}$, or not.

Referring again to FIG. 2, a downstream drive roller 240 according to embodiments can have a higher rotational velocity than an upstream drive roller 242. The result of the difference in rotational velocities is that upstream drive roller 242 has the effect of being a 'drag' on the ITM 210. This can be 'designed-in' to the operation of the printing system 100 as a way of applying or maintaining a longitudinal tension force F in the ITM 210 that helps ensure that the ITM 210 is taut as it passes through the image-forming station 212 and under the print bars $222_1 \ldots 222_N$. The longitudinal tension force, the direction of which is indicated in FIG. 2 by the arrow marked F (the arrow shows only direction and does not indicate location or magnitude), propagates through the section of the ITM 210 that is between downstream drive roller 240 and upstream drive roller 242, i.e., the section between Points A and B in FIG. 2, and as a result the surface velocity of the ITM 210 monotonically increases from Point A to Point B. (Note: for the purpose of this discussion, Points A and B might be anywhere along the arcs where ITM 210 is in contact with the respective drive rollers 240, 242, and the precise location along each respective arc can be calculated but is not particularly relevant here.) This means that for every adjacent two guide rollers 232, the ITM 210 will have a higher velocity at the more downstream one than at the more upstream one, and the more downstream one will have a higher rotational velocity than the more upstream one. In an alternative embodiment (not shown) which produces the same resulting longitudinal tension force, the downstream roller 240 can have the same rotational velocity as upstream roller 242 (or even a smaller rotation velocity than upstream roller 242) if downstream roller 240 has a larger diameter than upstream roller 242.

Figure 4A:
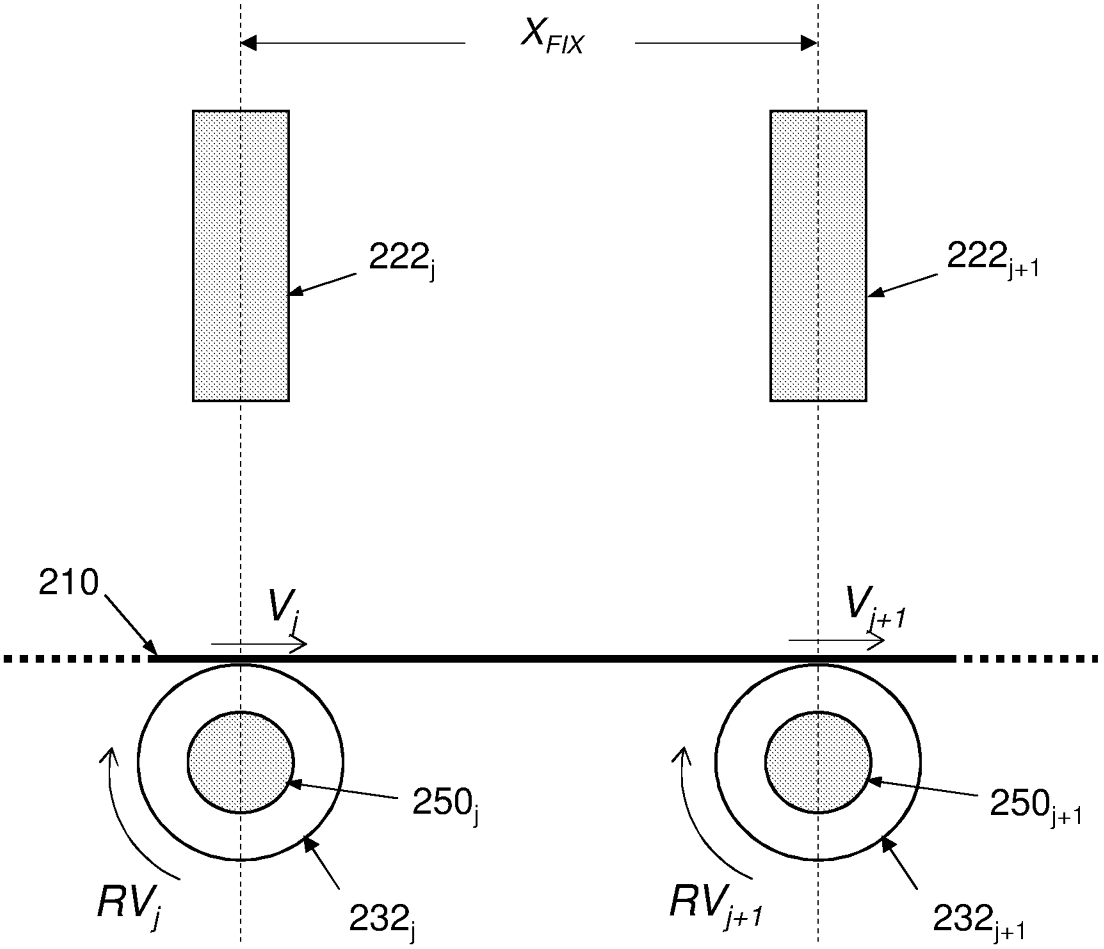

Referring now to FIG. 4A, neighboring print bars $222_j$ and $222_{j+1}$ are respectively aligned with neighboring guide rollers $232_j$ and $232_{j+1}$. A local linear velocity of the ITM 210 at the downstream guide roller $232_{j+1}$ is $V_{j+1}$, and a local linear velocity of the ITM 210 at the upstream guide roller $232_j$ is $V_j$. The travel of the ITM 210 at these respective velocities causes downstream neighboring print bar $222_{j+1}$ to rotate with rotational velocity $RV_{j+1}$ and upstream neighboring print bar $222_j$ to rotate with rotational velocity $RV_j$. Downstream guide roller $232_{j+1}$ includes encoder $250_{j+1}$, and upstream guide roller $232_j$ includes encoder $250_j$. Each encoder 250 is operative to record (or, alternatively and equivalently, cause to record, or be used in the recording of) the respective rotational velocity RV of corresponding guide roller 232 in real time, with the frequency of such recording (e.g., number of values recorded per minute or per second) being a design choice. The recording can be in a non-transitory computer storage medium to enable later analysis or other purposes, or can be in a transitory computer storage medium for use in further calculations that may use rotational velocity of guide rollers, or in both. For example, each rotational velocity RV value can be used to determine a local ITM 210 linear velocity V at each respective guide roller 232. The determining can be done by a controller or other electronic circuitry (not shown in FIG. 4A), as will be discussed later in this disclosure, which can be configured to calculate a linear velocity V of the ITM 210 from a rotational velocity RV by using a known diameter or radius of a respective roller 232 in which an encoder 250 is installed. In other words, a rotational velocity RV can be 'translated' to a linear velocity V in a straightforward manner.

Referring again to FIG. 2, longitudinal tension force F, imparted by the difference in rotational velocities of the drive rollers 240, 242, keeps the ITM 210 taut. Because of longitudinal elasticity of the ITM 210, the tension force F can cause the section of the ITM 210 between Points A and B to become not only taut, but also longitudinally stretched. Estimating the extent of this stretching can be a useful step in controlling the deposition of ink droplets onto the ITM 210 so as to compensate for the stretching. One way of estimating the extent of the stretching is to derive a stretch factor for each print bar, preferably a print-bar-specific stretch factor that is valid and applicable at a given point in time or during a given time interval. A stretch factor can be used, inter alia, to control the spacing of ink droplets deposited onto ITM 210 so as to compensate for the stretching. The skilled artisan will appreciate that stretching of an ITM 210 at any point along its length can also be increased or mitigated by other factors such as, for example, temperature, humidity, friction at the guide rollers, cleanliness of any of the relevant components; i.e., the difference in rotational velocity (and/or diameter) of the drive rollers 240, 242 may not be the only contributory factor to the stretching, but this does not affect the efficacy of the methods and systems described herein.

Figure 4B:
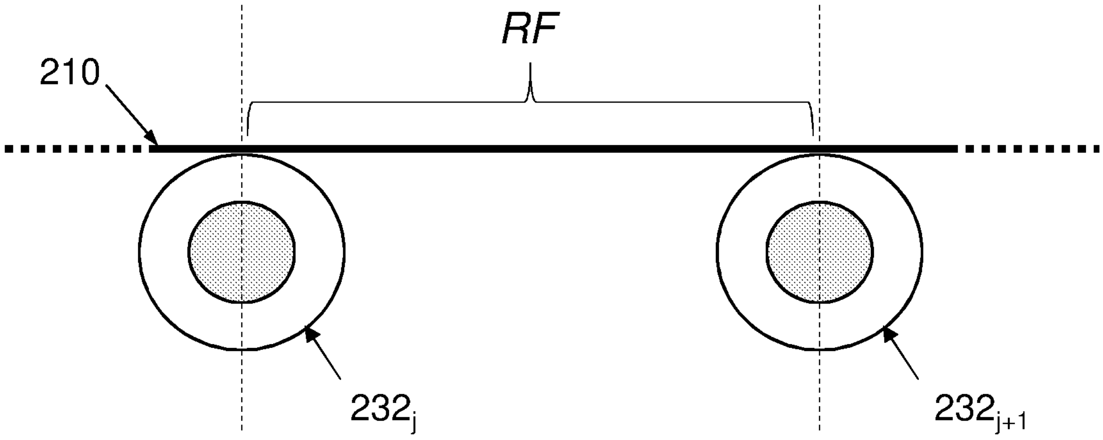

FIG. 4B illustrates the neighboring guide rollers $232_j$ and $232_{j+1}$ of FIG. 4A, and shows a reference portion RF of the ITM 210 between the two guide rollers $232_j$ and $232_{j+1}$. Reference portion RF of the ITM 210 is a physical segment of the ITM 210 which at times can be equal in length to the fixed physical distance $X_{FIX}$ between corresponding print bars $222_j$ and $222_{j+1}$ of FIG. 4A, and which at other times can be a different length than $X_{FIX}$ because of the aforementioned longitudinal stretching. Whilst FIG. 4B (taken in combination with FIG. 4A) shows RF and $X_{FIX}$ as being of equal length, this is shown for convenience only and illustrates only one idealized situation. The actual length of the reference portion RF, whether stretched or unstretched, can be estimated at any given time and used as an indication of stretching of the ITM 210 at the downstream print bar $222_{j+1}$. As a non-limiting example, the integral of the linear velocity $V_{j+1}$ of the ITM 210 at downstream drive roller $232_{j+1}$, i.e., as the ITM 210 passes downstream print bar $222_{j+1}$ and downstream drive roller $232_{j+1}$, can be taken over a time interval TT. As another non-limiting example, the integral of the linear velocity $V_j$ of the ITM 210 at upstream drive roller $232j$, i.e., as the ITM 210 passes upstream print bar $222_j$ and upstream drive roller $232_j$, can be taken over a time interval TT. An example of a time interval TT is a time interval that represents a nominal travel time of a length of ITM 210 equivalent in length to the reference portion RF over a fixed distance such as $X_{FIX}$. The nominal travel time can be derived, in a non-limiting example, by estimating or calculating a nominal system-wide velocity of the ITM 210, e.g., the total length of the ITM 210 divided by a designed or observed time for the ITM 210 to make a complete revolution. In other examples, TT can be obtained in other ways, for example by experimentation with an operating printing system 100.

In embodiments, a first estimated length or 'downstream-based' estimated length $X_{EST}(TT)_{j+1}$ is calculated by integrating velocity measurements $V_{j+1}$ (the velocity under downstream print bar $\mathbf{222}_{j+1}$) over a time interval TT corresponding to the travel time of the reference portion RF at a pre-determined velocity. $X_{EST}(TT)_{j+1}$ is the time-interval-specific (i.e., specific to time period TT) estimated stretched length of the reference portion RF. In other embodiments, a second estimated length or 'upstream-based' estimated length $X_{EST}(TT)_j$ of the reference portion RF is calculated by integrating velocity measurements $V_j$ (the velocity of the ITM 210 under upstream print bar **222*j*) over the same time interval TT. The propagation of the tension force F through the reference portion RF produces an increase in velocity along the distance traveled from upstream print bar $\mathbf{222}_j$ to downstream print bar $\mathbf{222}_{j+1}$; therefore, downstream velocity $V_{j+1}$ at the downstream roller $\mathbf{232}_{j+1}$ is higher than upstream velocity $V_j$ at upstream roller 232*j*, and the downstream-based estimated length $X_{EST}(TT)_{j+1}$ is therefore greater than upstream-based estimated length $X_{EST}(TT)_j$. As previously noted, this force F is due to the rotational velocity (and/or diameter) of downstream drive roller 240 being greater than that of upstream drive roller 242**. The increase in velocity can be a linear function of the distance from upstream print bar $\mathbf{222}_j$.

Figure 5:
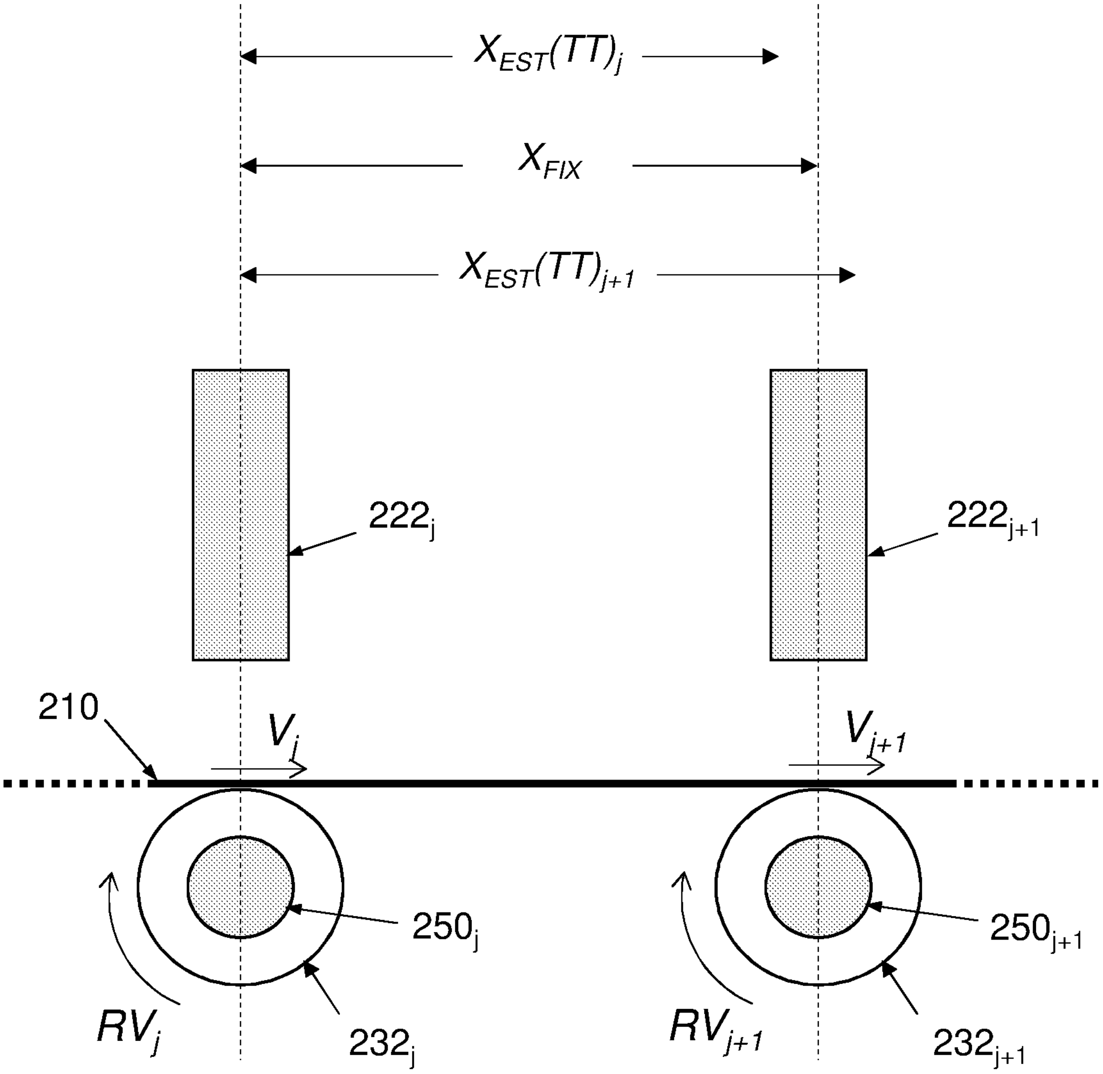
FIGS. 5 and 6 are schematic elevation-view illustrations of print bar and guide roller components of a printing system, showing comparisons of physical and estimated or calculated length and distance variables, according to embodiments.

As shown in FIG. 5, an estimated length $X_{EST}(TT)_{j+1}$ calculated using local velocity $V_{j+1}$ at downstream guide roller $\mathbf{232}_{j+1}$ is greater than $X_{FIX}$ (this discussion assumes that tension force F is applied to at least the reference portion RF of the ITM 210), and an estimated length $X_{EST}(TT)_j$ calculated using local velocity $V_j$ at upstream guide roller $\mathbf{232}_j$ is always less than $X_{FIX}$ in such a case. Moreover, if there are no other accelerating or decelerating factors (e.g., external forces), then the arithmetic average of $X_{EST}(TT)_j$ and $X_{EST}(TT)_{j+1}$ is equal to the known, fixed physical distance $X_{FIX}$. Thus, once $X_{EST}(TT)_j$ has been calculated using Vj, then $X_{EST}(TT)_{j+1}$ can be calculated by subtracting $X_{EST}(TT)_j$ from $X_{FIX}$ and then adding the remainder to $X_{FIX}$. For this reason, the selection of upstream versus downstream roller velocity (respectively, $V_j$ versus $V_{j+1}$) as the basis for the derivation of a stretch factor according to the embodiments disclosed herein does not affect the outcome of the derivation—even though the stretch factor is going to be applied when printing at the downstream print bar $\mathbf{222}_{j+1}$.

As the skilled practitioner will appreciate, it may not always be possible, practical or desirable to obtain enough velocity V data points during a time period TT to perform an integration of local velocity over time to obtain a distance. Therefore, any manner of alternative mathematical operation (or combination of operations) can be used in place of integration, as long as the mathematical operation calculates a reasonable estimation of stretched length. For example, if only one velocity measurement is available for a time interval—or, alternatively, if all velocity ($V_j$ or $V_{j+1}$) measurements at a given print bar for a time interval are equal—then the estimated length $X_{EST}(TT)_j$ or $X_{EST}(TT)_{j+1}$ can simply be calculated by multiplying the velocity value by the time interval, i.e., TT. If multiple velocity measurements are available, but not enough to perform an integration, the velocity measurements can be averaged (e.g., by arithmetic average, or weighted average that is weighted according to the respective proportions of time when each velocity value is measured) before multiplying.

Comparing estimated stretched length $X_{EST}(TT)_{j+1}$ to the known fixed-in-space physical length $X_{FIX}$—for example, calculating a ratio between the two values—produces a stretch factor SF for the reference portion RF. In other words, in a situation where a reference portion RF of the ITM 210 is not stretched by a tension force F, the length of reference portion RF might be equivalent or based upon (with an offset) to the fixed physical between-print-bar distance $X_{FIX}$; however, when the ITM is stretched, then the length of the stretched reference portion RF of the ITM 210 is larger by a factor of stretch factor SF (and approximately equal to $X_{EST}(TT)_{j+1}$). In some cases, an inter-droplet spacing is also made larger due to stretching, by a stretch factor SF. In some embodiments the length of reference portion RF is equal to $X_{FIX}$ at the impression station 216.

In an example, an inter-droplet spacing distance between a first ink droplet deposited on the ITM 210 by an upstream print bar $\mathbf{222}_j$ and a second ink droplet deposited by a downstream neighboring print bar $\mathbf{222}_{j+1}$ is controlled in order to take into account the stretch factor SF as applied to the length of the reference portion RF of the ITM 210. In one example, an inter-droplet spacing on the physical ITM 210 may be close to zero or even zero, as in the case of a color registration or same-color overlay at substantially the same place in an image. In another example, an inter-droplet spacing on the ITM 210 can be much larger if the two droplets are at different places in the image. Referring again to FIG. 5, the arrows indicating the respective lengths of $X_{EST}(TT)_{j+1}$) and $X_{FIX}$ illustrate this point thusly: the ratio between the length of the $X_{EST}(TT)_{j+1}$ arrow and the length of the $X_{FIX}$ arrow represents the stretching of a distance between the first and second ink droplets on the surface of the ITM 210 when at least the reference portion RF of the ITM 210 is stretched.

The skilled practitioner will understand that while the above example based on FIG. 5 involved a discussion of ink droplets deposited by successive print bars $\mathbf{222}_j$ and $\mathbf{222}_{j+1}$, this discussion is not intended to be limiting to the specific case of successive print bars, and the example should be interpreted so as to encompass ink droplets deposited by any two print bars 222 in the regardless of whether there are other print bars disposed between the two. For example, a first print bar $\mathbf{222}_{j-1}$ may deposit droplets of cyan-colored ink, a second print $\mathbf{222}_j$ may deposit droplets of magenta-colored ink, and a third print bar $\mathbf{222}_{j+1}$ may deposit droplets of yellow-colored ink. However, even though the distance between, for example, non-successive print bars $\mathbf{222}_{j-1}$ and $\mathbf{222}_{j+1}$ is greater than $X_{FIX}$ (generally speaking, an integer multiple of $X_{FIX}$ where the integer multiple is greater than 1), the stretch factor SF at downstream print bar $\mathbf{222}_{j+1}$ is still based on the relationship of $X_{EST}(TT)_{j+1}$ to $X_{FIX}$. because that appropriately captures the necessary data associated with stretching at the downstream print bar $\mathbf{222}_{j+1}$.

In another example, an inter-droplet spacing distance between an ink droplet deposited on the ITM 210 by a downstream print bar $\mathbf{222}_{j+1}$ and another ink droplet deposited by the same downstream print bar $\mathbf{222}_{j+1}$ is controlled in order to compensate for a stretch factor SF. A full-color ink image, as is known in the art, can typically comprise four monochromatic images (i.e., CMYK color separations of the single image) which are all printed substantially within the confines of the same ink-image space on the surface of an ITM 210, by different print bars. When printing each of the four (e.g., cyan, magenta, yellow and black) images, a stretch factor SF as applied to the length of the reference portion RF of the ITM 210 can be taken into account. This can compensate for stretching at the imaging station and optionally compensate for the extent to which the ITM 210, or any portion thereof, is stretched at the impression station where the ink images are eventually transferred to substrate. Thus, inter-droplet spacing of ink droplets of a given color deposited by a given print bar 222—in this example, upstream print bar $\mathbf{222}_j$—may be controlled based on the same stretch factor SF used in the earlier example with respect to inter-droplet spacing between ink droplets deposited by separate, e.g., upstream and downstream print bars $\mathbf{222}_j$ and $\mathbf{222}_{j+1}$.

Examples of Deriving Stretch Factors

In a first, downstream-based, example, $X_{FIX}$ is 30 cm, and a nominal velocity of the ITM 210 based on design specifications is 3.2 m/s. The time period TT is set at the quotient of $X_{FIX}$ divided by this nominal velocity, or 0.0125 s. During a time period TT, downstream velocity $V_{j+1}$ is measured, using encoder $\mathbf{250}_{j+1}$ of downstream roller $\mathbf{232}_{j+1}$, to be 3.23 m/s. This yields an estimated length $X_{EST}(TT)_{j+1}$ of the reference portion RF of 30.28125 cm and a stretch factor SF of 1.009375 when $X_{EST}(TT)_{j+1}$ is divided by $X_{FIX}$.

In a second, upstream-based, example, $X_{FIX}$ is 40 cm and the time period TT is set at a value equal to the quotient of $X_{FIX}$ divided by an ITM 210 velocity value of 2 m/s, or 0.02 s; the velocity was calculated in this example by timing an entire revolution of an ITM 210 with a known total length. During a time period TT, upstream velocity $V_j$ is measured multiple times, using encoder $\mathbf{250}_j$ of roller $\mathbf{232}_j$, and integrated over the time period TT (which equals 0.02 s). This integral, which serves as an estimated length $X_{EST}(TT)_j$ of the reference portion RF, is calculated to be 39.90 cm. As discussed earlier, $X_{FIX}$ is equivalent to the arithmetic average of $X_{EST}(TT)_j$ and $X_{EST}(TT)_{j+1}$, and the difference between fixed physical distance $X_{FIX}$ minus estimated distance $X_{EST}(TT)_j$ calculated using velocity $V_j$ measured at the upstream print bar $\mathbf{222}_j$, will equal the difference between an estimated distance $X_{EST}(TT)_{j+1}$ calculated at downstream print bar $\mathbf{222}_{j+1}$ minus $X_{FIX}$. Thus, we can obtain a stretch factor SF of 1.025 by (a) calculating an $X_{EST}(TT)_{j+1}$ of 0.0401 m (by subtracting 39.90 cm from 40 cm, and adding the difference to 40 cm, and (b) dividing the value of $X_{EST}(TT)_{j+1}$ by $X_{FIX}$.

In some embodiments, a pre-determined time interval (or time period) TT, which as described above, can correspond to the travel time of a reference portion RF of the ITM 210 at a pre-determined velocity, is divided into time intervals $TI_1 \ldots TI_M$, where each time interval $TI_i$ is one of M consecutive preset divisions of the predetermined time period TT. In some embodiments, each time interval $TI_i$ is exactly one M-th of the time period TT, in which case all M of the M consecutive subdivision time intervals $TI_1 \ldots TI_M$ are equal to each other. In other embodiments, the M consecutive time intervals $TI_1 \ldots TI_M$ can have different durations, in a sequence that repeats every M consecutive time intervals, such that at any given time, the immediately previous M consecutive time intervals $TI_i$ will add up to TT.

By dividing the time period TT into M time intervals, it is possible to apply the methods and calculations discussed above with respect to time period TT, with higher resolution, that is, with respect to smaller time intervals $TI_i$. In this way it can be possible to derive a more precise estimation of the length of a reference portion of the ITM, and from there a more precise stretch factor SF. This means deriving, for each time interval $TI_i$ of the M time intervals $TI_i$, a time-interval-specific stretch factor $SF(TI_i)$ and a time-interval-specific estimated length $X_{EST}(TI_i)$ of the reference portion RF of the ITM. Note: the notation SF(TIi) and $X_{EST}$(TIi) for each of the time-interval-specific stretch factors and estimated lengths, respectively, indicates that each calculation is performed with respect to data (e.g., angular velocities) measured in that specific time interval and is valid for that specific time interval.

In embodiments, M can be any positive integer. For example, M can equal 1. If M equals 1, then there is only one time interval $TI_i$ (i.e., $TI_1$), and $TI_1$ is equivalent to TT; the resolution or precision of the derivation of a stretch factor is the same as in the foregoing discussion, which can be referred to as the "M=1 case". An M equal to 1 might be chosen, for example, if it is not possible or practical to measure velocity with greater time-resolution, or if a print controller cannot adjust stretch factors or inter-droplet spacings frequently enough to justify the collection of the additional data. Alternatively, a low value of M, even a value of 1, might be chosen if it is determined that increasing the value of M will not increase the precision of the derivation of the stretch factor enough to justify the additional computing power. Otherwise, M can be chosen to be greater than 1 in order to increase the precision of the derivation of the stretch factor. In other examples, M is between 1 and 1,000. In still other examples, M is between 10 and 100. It is possible to experiment and determine a value of M beyond which there is no increase in precision of the stretch factor—this value will be design-specific for a given printing system.

As a result of dividing the time period TT into M time intervals $TI_1 \ldots TI_M$ for the purpose of compensating for longitudinal stretching of an ITM, for example the stretching caused by differences in rotational velocity between a downstream drive roller and an upstream drive roller, it is possible to derive and apply a stretch factor $SF(TI_i)$ during each time interval $TI_i$. This time-interval-specific stretch factor $SF(TI_i)$ can be derived from a time-interval-specific estimated length $X_{EST}(TI_i)$ of the reference portion RF of the ITM, and the time-interval-specific estimated length $X_{EST}(TI_i)$ can be calculated by summing segment-lengths $X_{SEG}(TI_i)$ calculated from local velocities V measured during each respective time interval $TI_i$. Specifically, the time-interval-specific estimated length $X_{EST}(TI_i)$ can be calculated by summing segment-lengths $X_{SEG}(TI_i)$ calculated for the immediately preceding M time intervals $TI_i$.

Figure 6:
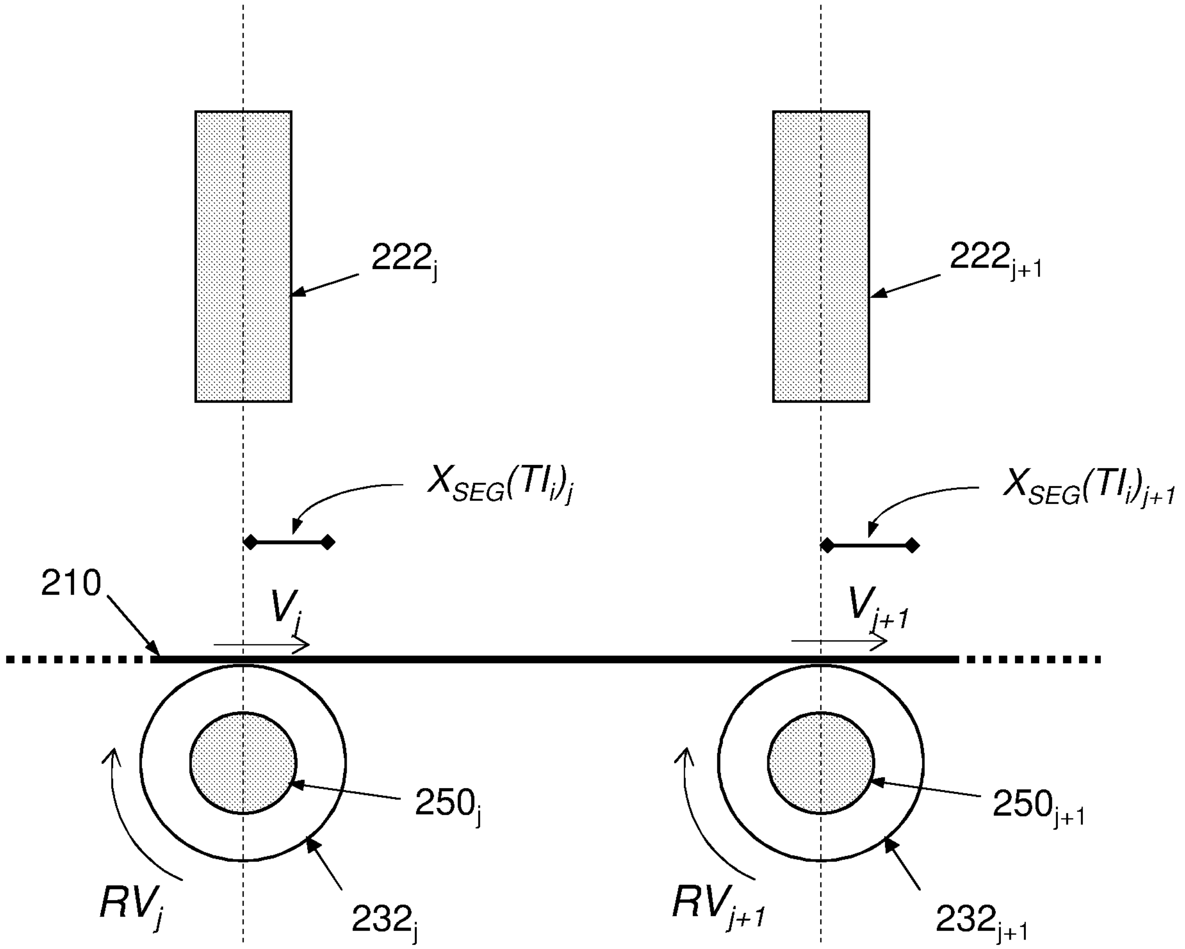

Referring now to FIG. 6, the estimated length of a segment $X_{SEG}(TI_i)_j$, i.e., a segment-length specific to time interval $TI_i$ and calculated from local velocity $V_j$ of the ITM 210 at the upstream guide roller $\mathbf{232}_j$, can be calculated from measurements of local velocity $V_j$ which are made by encoder $\mathbf{250}_j$. The calculations can use integration of velocity $V_j$ values over the time interval $TI_i$, or other appropriate mathematical operators (in the same manner as discussed above with respect to $X_{EST}(TT)_j$ and $X_{EST}(TT)_{j+1}$). Similarly, a value for the length of segment $X_{SEG}(TI_i)_{j+1}$ can be calculated using measurements of velocity $V_{j+1}$ of the ITM 210 at the downstream guide roller $\mathbf{232}_{j+1}$. A new segment-length $X_{SEG}(TI_i)_j$ or $X_{SEG}(TI_i)_{j+1}$ can be calculated for each subsequent and consecutive time-interval $TI_i$, each one of the segment-lengths $X_{SEG}(TI_i)_j$ or $X_{SEG}(TI_i)_{j+1}$ being calculated from at least one value of velocity ($V_j$ or $V_{j+1}$, respectively) measured during the respective time interval $TI_i$.

Figure 7:
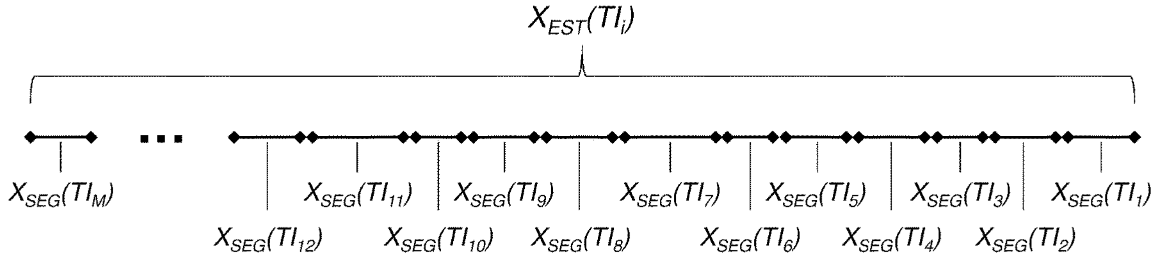
FIG. 7 is a schematic diagram of the summation of estimated time-interval-specific segment lengths over a predetermined time period TT, according to embodiments.

FIG. 7 shows how segment lengths $X_{SEG}(TI_1) \ldots X_{SEG}(TI_M)$ calculated from local velocity measurements for the immediately preceding M time intervals $TI_1 \ldots TI_M$ are summed, in order to obtain a time-interval-specific stretched length estimate $X_{EST}(TI_i)$. As noted earlier, the convention in this disclosure is that movement of the ITM 210 at the image-forming station 212 is always shown as left-to-right in the figures, and for this reason alone, the successive segment lengths $X_{SEG}$(TI1) . . . $X_{SEG}(TI_M)$ are shown from right to left: The first (oldest) segment length by chronological sequence, $X_{SEG}(TI_1)$, is shown at right, and the M-th, or last (most recent) segment length of the immediately preceding M segment lengths (i.e., the segment lengths calculated for the immediately preceding M time intervals $TI_i$), $X_{SEG}(TI_M)$, is shown at left.

The following discussion relates to the expression "immediately preceding M time intervals $TI_i$" as used herein: As discussed with respect to various embodiments, in each time interval $TI_i$ which is one of M consecutive pre-set subdivisions of time period TT, a time-interval-specific stretch factor $SF(TI_i)$ is to be determined by comparing an estimated length $X_{EST}(TI_i)$ of reference portion RF of ITM 210—when stretched by tension forces in the ITM 210—to the fixed physical distance $X_{FIX}$ between upstream and downstream print bars 222$_j$, 222$_{j+1}$. By "comparing" we mean performing one or more mathematical operations, as detailed earlier. The estimated length $X_{EST}(TI_i)$ used in determining the time-interval-specific stretch factor $SF(TI_i)$ is calculated for every time interval $TI_i$, meaning M times as frequently as the "M=1 case" where a stretch factor SF is calculated only once for each entire undivided time period TT. When M is greater than 1, then $X_{EST}(TI_i)$ is calculated by summing up M segment-lengths $X_{SEG}(TI_i)$ corresponding to M consecutive time intervals $TI_i$. The summing up may begin, as a non-limiting example, with setting the time interval $TI_i$ for which $X_{EST}(TI_i)$ is being calculated to $TI_1$, or, as a second non-limiting example, starting with the time interval $TI_i$ that came just before that one being set to $TI_1$. As long as M consecutive time intervals $TI_i$ are addressed in the summing-up, it doesn't matter that the segment-lengths $X_{SEG}(TI_i)$ may relate to time intervals $TI_i$ of different durations—because of the commutative property of addition, any M consecutive time intervals TIi will always add up to TT and the segment-lengths $X_{SEG}(TI_i)$ corresponding to the M consecutive time intervals TIi can be summed up to yield the time-interval-specific estimated length $X_{EST}(TI_i)$ for the reference portion RF, valid for time interval $TI_i$.

The preceding discussion, for the sake of clarity, was neutral with respect to which of the upstream and downstream rollers 232$_j$, 232$_{j+1}$ was the basis for velocity measurements V that were used in calculating segment-lengths $X_{SEG}(TI_i)$ and summing up segment-lengths $X_{SEG}(TI_i)$ to determine an estimated length $X_{EST}(TI_i)$. As explained earlier with respect to the M=1 case, either of the upstream or downstream roller-encoder pairs (i.e., upstream roller 232$_j$ with encoder 250$_j$, or downstream roller 232$_{j+1}$ with encoder 250$_{j+1}$) may be used. In the case that velocity V measurements of the ITM 210 are taken at the upstream roller 232$_j$, then in each time interval $TI_i$ an upstream-based segment-length $X_{SEG}(TI_i)_j$ is calculated from the one or more velocity values V measured during each time interval $TI_i$ of time intervals $TI_1$ . . . $TI_M$. M consecutive calculated upstream-based segment-length $X_{SEG}(TI_1)_j$ . . . XSEG$(TI_M)_j$ for M consecutive time intervals $TI_1$ . . . $TI_M$ are summed to yield an upstream-based time-interval-specific estimated length $X_{EST}(TI_i)_j$ of reference portion RF. Alternatively, if velocity V measurements of the ITM 210 are taken at the downstream roller 232$_{j+1}$, then in each time interval $TI_i$ a downstream-based segment-length $X_{SEG}(TI_i)_{j+1}$ is calculated from the one or more velocity values V measured during each time interval $TI_i$ of time intervals $TI_1$ . . . $TI_M$. M consecutive calculated downstream-based segment-length $X_{SEG}(TI_1)_{j+1}$ . . . XSEG$(TI_M)_{j+1}$ for M consecutive time intervals $TI_1$ . . . $TI_M$ are summed to yield a downstream-based time-interval-specific estimated length $X_{EST}(TI_i)_{j+1}$ of reference portion RF. From this point, a time-interval-specific stretch factor $SF(TI_i)$ may be calculated in the same ways that the stretch factor SF was calculated in the M=1 case. In other words, calculating a time-interval-specific stretch factor $SF(TI_i)$ on the basis of time-interval-specific estimated length $X_{EST}(TI_i)_{j+1}$ is entirely analogous to calculating a stretch factor SF on the basis of estimated length $X_{EST}(TT)_{j+1}$, and calculating a time-interval-specific stretch factor $SF(TI_i)$ on the basis of time-interval-specific estimated length $X_{EST}(TI_i)_j$ is entirely analogous to calculating a stretch factor SF on the basis of estimated length $X_{EST}(TT)_j$.

Figure 8:
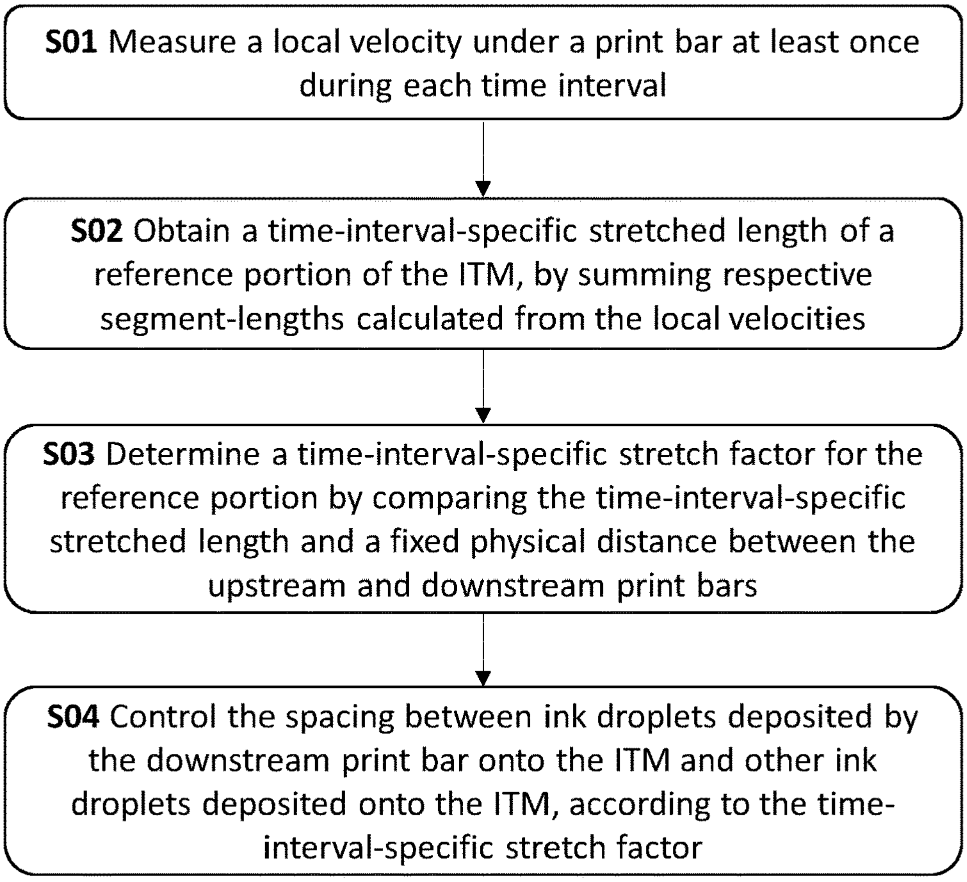
FIG. 8 shows a flowchart of a method of using a printing system, according to embodiments.

A method of printing using a printing system 100 is disclosed, including method steps shown in the flowchart in FIG. 8. The method can be performed using a printing system 100 that comprises (i) a flexible ITM 210 disposed around a plurality of guide rollers 232 (232$_1$ . . . 232$_N$) including respective upstream and downstream guide rollers 232$_j$, 232$_{j+1}$ at which respective upstream and downstream encoders 250$_j$, 250$_{j+1}$ are installed, and (ii) an image-forming station 212 at which ink images are formed by droplet deposition. The image-forming station 212 can comprise upstream and downstream print bars 222$_j$, 222$_{j+1}$ disposed over the ITM 210 and respectively aligned with the upstream and downstream guide rollers 232$_j$, 232$_{j+1}$, and the upstream and downstream print bars 222$_j$, 222$_{j+1}$ can define a reference portion RF of the ITM 210. The method comprises:

a. Step S01, measuring a local velocity V of the ITM 210 under one of upstream and downstream print bars 222$_j$, 222$_{j+1}$. Measurements of velocity V can be based on measurements of rotational velocity RV made by respective upstream and downstream encoders 250$_j$, 250$_{j+1}$ installed at respective upstream and downstream guide rollers 232$_j$, 232$_{j+1}$. (Rotational velocity is converted to linear velocity by V=RV*R, where R is the radius of roller) Velocity V measurements/calculations are made at least once during each time interval $TI_i$. Each time interval $TI_i$ is one of M consecutive pre-set divisions of a time period TT, which in some embodiments can be a measured travel time of a reference portion RF of the ITM 210 over a fixed distance $X_{FIX}$ between the upstream and downstream print bars 222$_j$, 222$_{j+1}$. The M pre-set time intervals $TI_1$ . . . $TI_M$ can be all of the same duration, or can be of different durations. M can equal 1, or can equal any positive integer greater than 1.

b. Step S02, obtaining a time-interval-specific stretched length $X_{EST}(TI_i)$ of a reference portion RF of the ITM 210, by summing respective segment-lengths $X_{SEG}(TI_i)$ calculated from the local velocities V measured during each respective time interval $TI_i$. The calculating of segment lengths from distances can include integrating, summing, and/or multiplying.

c. Step S03, determining a time-interval-specific stretch factor $SF(TI_i)$ for the reference portion RF by comparing (e.g, dividing or otherwise performing mathematical operations) the time-interval-specific stretched length $X_{EST}(TI_i)$ and the fixed physical distance $X_{FIX}$ between the upstream and downstream print bars 222$_j$, 222$_{j+1}$.

d. Step S04, controlling inter-droplet spacing between ink droplets deposited onto the ITM 210 by the downstream print bar 222$_{j+1}$ and other ink droplets deposited onto the ITM 210, the controlling being in accordance with the time-interval-specific stretch factor $SF(TI_i)$ or with any other measure using data associated with stretching of the ITM 210. The controlling can be done so as to compensate for the stretching of the reference portion RF of the ITM 210. In some embodiments, the 'other ink droplets' are deposited onto the ITM 210 by an upstream print bar, such as upstream print bar $\mathbf{222}_j$. As discussed elsewhere in this disclosure, the other ink droplets can be deposited onto ITM 210 by any print bar 222 that is located upstream of downstream print bar $\mathbf{222}_{j+1}$, for example print bar $\mathbf{222}_{j-1}$. The 'other ink droplets' can be in a different color (and the stretching compensation is performed for color registration purposes) or in the same color (and the stretching compensation is performed for image overlay purposes). In other embodiments, the 'other ink droplets' are also deposited onto the ITM 210 by downstream print bar $\mathbf{222}_{j+1}$ and are of the same color, and are intended to be deposited in different locations within an ink image.

In some embodiments, not all of the steps of the method are necessary.

In some embodiments, a stretch factor is used for modifying inter-droplet spacing such that the spacing between two ink droplets deposited upon the ITM is greater when the ITM is locally stretched than when it is not, and the inter-droplet spacing is adjusted using the stretch factor so as to compensate for the stretching. In some embodiments, ITM can be unstretched when images are transferred to a substrate (e.g., a paper or plastic medium) at an impression station. In such cases, applying the stretch factor at the image-forming station ensures that an undistorted image is transferred to substrate. In some embodiments, an ITM is stretched at an impression station by a longitudinal force. The stretching at the impression station can be different than the stretching at the image-forming station where the ink droplets are deposited upon the ITM. For example, the stretching at the impression station can be less than the stretching at the image-forming station. In some embodiments, a stretch factor ratio is calculated or tracked, where the stretch factor ratio is the ratio between a first ITM stretch factor at the image-forming station and a second ITM stretch factor at the impression station. The stretch factor ratio can be applied at the image-forming station, where the inter-droplet spacing of droplets deposited onto an ITM is controlled in accordance with the stretch factor ratio.

Figure 9:
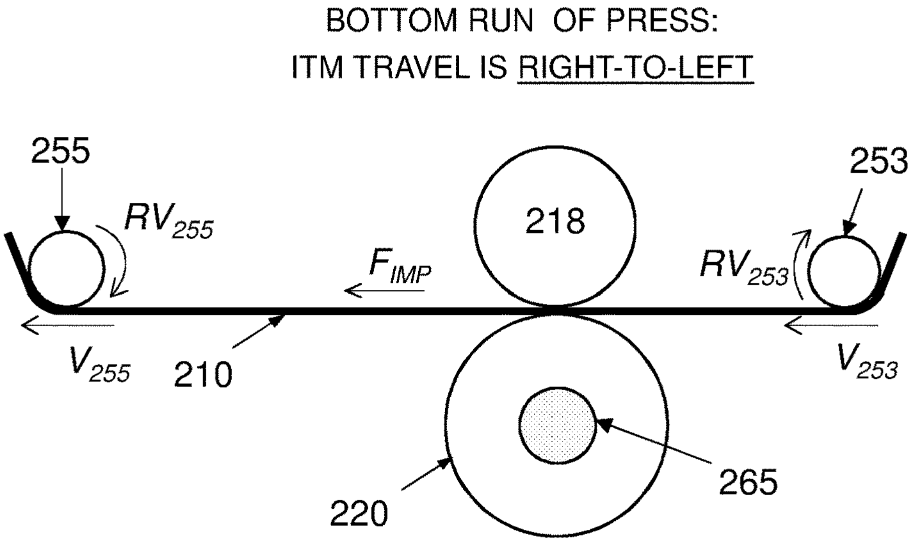
FIG. 9 is an elevation-view illustration of a bottom run of a printing system and the impression station thereof, according to embodiments.

Referring to FIG. 9, ink images are transferred to substrate (not shown) when the image-carrying ITM 210 passed between an impression cylinder 220 and a pressure cylinder 218. FIG. 9 illustrates the 'bottom run' of a printing system (for example: printing system 100 of FIG. 1 or FIG. 2), and therefore the travel of the ITM 210 is shown as right-to-left. In some embodiments, roller 255, downstream of impression cylinder 220, is a drive roller, and roller 253, upstream of impression cylinder 220, is also a drive roller. Roller 255 rotates with a rotational velocity of $RV_{255}$ and roller 253 rotates with a rotational velocity of $RV_{253}$. The ITM 210 will have a local velocity $RV_{255}$ at downstream roller 255 and a local velocity $RV_{253}$ at upstream roller 253. If the two rotational velocities are different, i.e., if $RV_{255}>RV_{253}$, then a longitudinal tension force $F_{IMP}$ will cause the ITM 210 to become locally stretched between the two rollers 253, 255. A local stretch factor for the impression station, $SF_{IMP}$, can be calculated or estimated by applying any of the methods disclosed herein with respect to obtaining stretch factors SF or $SF(TI_i)$ at an image-forming station. Either of the stretch factors can alternatively be estimated or empirically derived, for example, through trial-and-error with multiple print runs, or by using other experimental tools to measure velocities, accelerations or forces.

Applying Stretch Factors and Stretch Factor Ratios

Stretch factors and stretch factor ratios can be used in a number of ways to improve the quality of printed images produced by digital printing systems, and especially indirect inkjet printing systems using intermediate transfer media. Stretch factors and stretch factor ratios can be used to improve color registration and overlay printing by ensuring that the spacing of droplets being deposited by one or more print bars takes into account the local stretching of a reference portion RF of the ITM 210 corresponding to the distance between print bars. Stretch factors and stretch factor ratios can be used to compensate for the local stretching of the ITM 210 at the one or both of an image-forming station and an impression (image-transfer) station, and also to compensate for the difference or ratio between stretch factors at the two stations.

Figure 10:
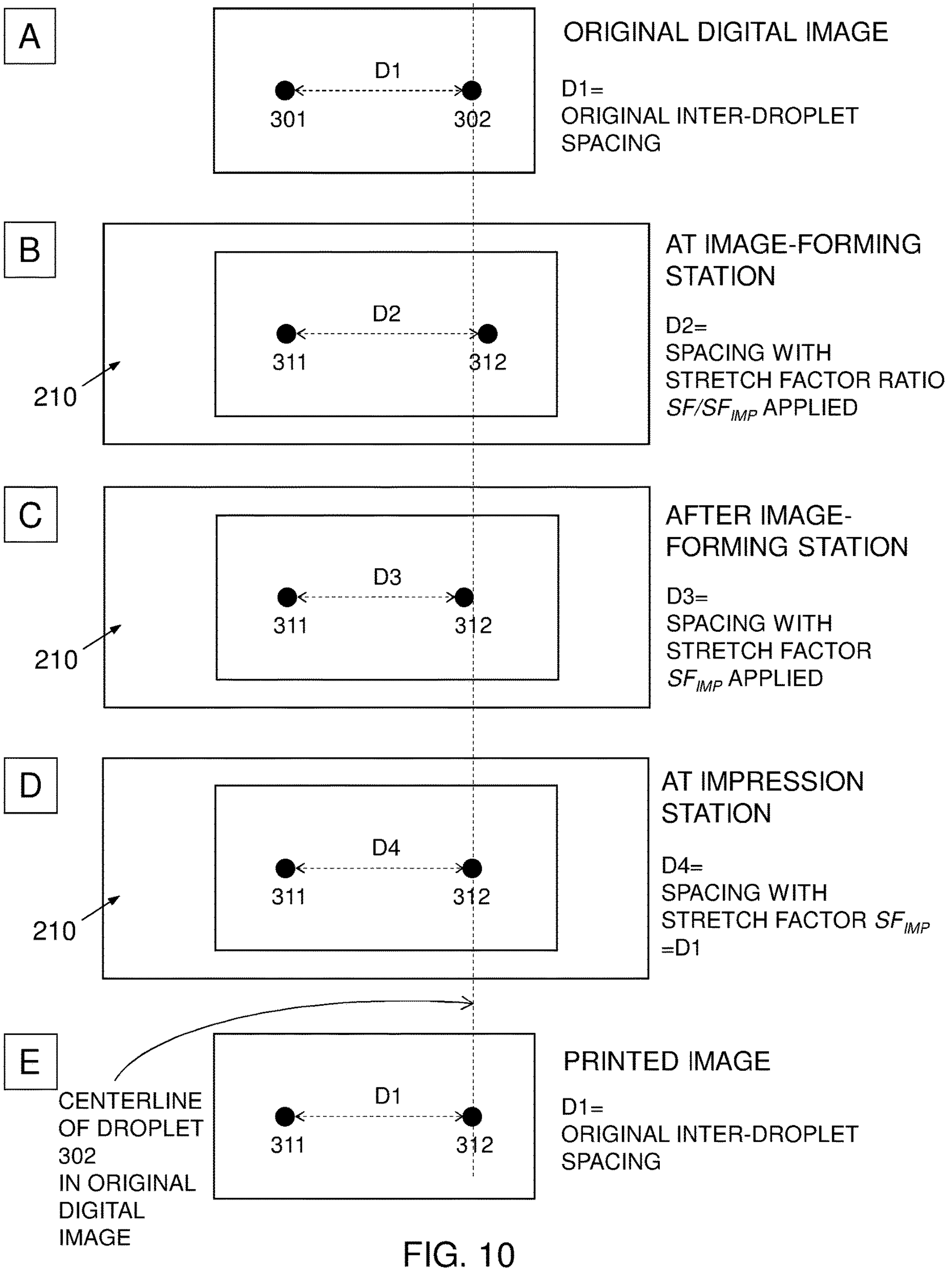
FIG. 10 shows illustrations of various inter-droplet spacings at various locations in a printing system, according to embodiments.

We refer now to FIG. 10, which illustrates, by example, how stretch factors and a stretch factor ratio can be applied to spacing between ink droplets in a printing process. According to embodiments, such as any of the embodiments disclosed herein, a first ITM stretch factor SF—or, alternatively: $SF(TI_i)$—is calculated to represent the local stretching of the ITM 210 at a given downstream print bar $\mathbf{222}_{j+1}$, for example, a print bar $\mathbf{222}_{j+1}$ at which one or both of ink droplets 311, 312 are deposited: In some embodiments, only ink droplet 312 is deposited at print bar $\mathbf{222}_{j+1}$, and ink droplet 311 is deposited by a print bar further upstream, such as print bar $\mathbf{222}_j$ or print bar $\mathbf{222}_{j-1}$. In other embodiments, both of ink droplets 311, 312 are deposited at print bar $\mathbf{222}_{j+1}$. A second ITM stretch factor $SF_{IMP}$ is calculated to represent the local stretching of the ITM 210 at the impression cylinder 220. As shown in Part A of FIG. 10, an original half-toned digital image comprises pixels 301 and 302, spaced apart a distance D1 (i.e., such that when the image is printed, ink representing the two pixels will be printed using droplets deposited with an inter-droplet spacing D1).

Part B shows the relative spacing of the two ink droplets 311, 312 deposited onto the ITM 210 on the basis of the respective values of the two pixels 301, 302. The distance between the two ink droplets 311, 312 as deposited is D2. D2 is deliberately made greater than D1 by controlling the inter-droplet spacing at the print bar $\mathbf{222}_{j+1}$, because of the application of a stretch factor ratio $SF/SF_{IMP}$. This ratio is equal to a stretch factor SF at the image-forming station divided by a stretch factor $SF_{IMP}$ at the impression station (e.g., between the two drive rollers 253, 255 of FIG. 9).

Part C shows the relative spacing of the two ink droplets 311, 312 at location on the ITM 210 after the image-forming station and before the impression station—in other words, when the ITM 210 is presumably slack and there is no specific longitudinal tension applied. Here, the two ink droplets 311, 312 are a distance D3 apart. D3 is smaller than D1 (and, by extension, D2), i.e., the ink droplets are closer together than they are meant to be in the final printed image. This is because the stretching of the ITM 210 at the impression station will cause the distance between the two ink droplets to grow once more, to the original planned D1. The ratio of D1 to D3 is preferably equivalent to the stretch factor $SF_{IMP}$ at the impression station.

Part D of FIG. 10 confirms that, once past a drive roller 253 upstream of impression cylinder 220, the ITM 210 is once again stretched, this time by the impression station stretch factor $SF_{IMP}$, and the inter-droplet spacing that 'shrank' to D3 in the 'slack' part of the ITM's rotation in Part C is now stretched back out to D4, which—if all of the stretch factors and stretch factor ratios have been well calculated or estimated—equals D1.

Part E shows the printed image on substrate after transfer at the impression station, and the inter-droplet spacing is D1, the same as the original planned spacing.

The skilled artisan will understand that the process illustrated in FIG. 10 can be carried out using only a stretch factor SF at the imaging station, merely by setting $SF_{IMP}$, the value of the stretch factor at the impression station, to 1. In cases where the longitudinal tension applied by guide rollers (e.g., guide rollers 253, 255) in the bottom run is lower or much lower than that imparted by guide rollers (e.g., guide roller 240, 242) in the top run, this can be a suitable emulation of using a stretch factor ratio. In other cases, the use of a stretch factor ratio instead of a single ITM stretch factor may produce better printing results. For example, it may be possible to adjust the longitudinal tension of the ITM 210 in the bottom run of a printing system 100 to be substantially equal to the longitudinal tension in the top run. In such a case, as can be understood from the preceding discussion of FIG. 10, the respective ITM stretch factors SF at the imaging station and $SF_{IMP}$ at the impression station are substantially the same, the stretch factor ratio is approximately equal to 1, and no compensation need be made for ITM stretching during ink deposition. The resulting ink images will appear distorted in the 'slack' portion of the ITM where no longitudinal tension is applied between the imaging station and the impression station, but the distortion will be substantially eliminated at the impression station by the application of longitudinal tension there.

Figure 11A:
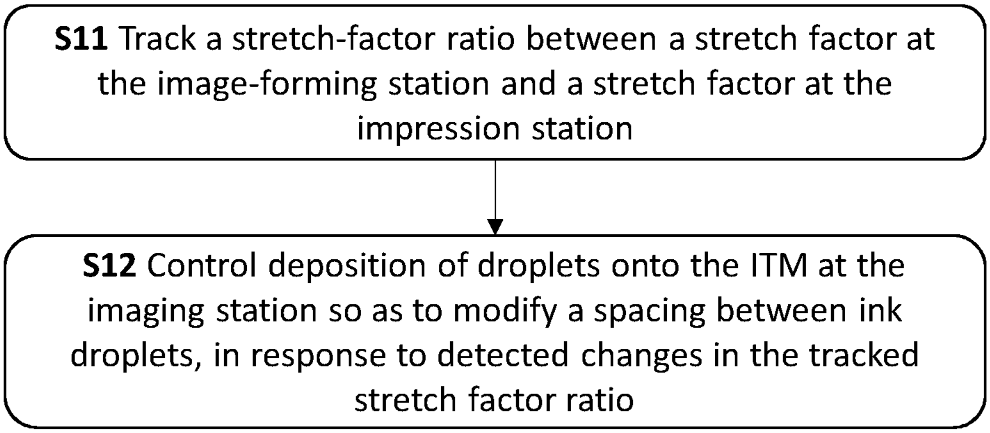
FIGS. 11A, 11B, 12 and 13 show flowcharts of methods of using a printing system, according to various embodiments.

A method of printing using a printing system 100 is now disclosed, including method steps shown in the flowchart in FIG. 11A. The method can be carried out using a printing system, for example printing system 100 of FIG. 1 which comprises an image-forming station 212 at which ink images are formed by droplet deposition on a rotating flexible ITM 210, and (ii) an impression station 216 downstream of the image-forming station 212 at which the ink images are transferred to substrate 231. The method comprises:

a. Step S11, tracking a stretch-factor ratio between a stretch factor at the image-forming station 212 and a stretch factor at the impression station 216. Each stretch factor (for example stretch factor SF or $SF(TI_i)$ at the image-forming station 212 and stretch factor $SF_{IMP}$ at the impression station 216) can be measured, estimated or calculated according to the various embodiments disclosed herein. In some embodiments, the image-forming station 212 of the printing system 100 comprises a plurality of print bars 222, and the tracking a stretch-factor ratio between a stretch factor of the ITM at the image-forming station 212 and a stretch factor at the impression station 216 includes tracking a respective stretch-factor ratio between a local stretch factor at each print bar $\mathbf{222}_j$ of print bars $\mathbf{222}_1 \ldots \mathbf{222}_N$ of the image-forming station 212 and a stretch factor at the impression station 216.

b. Step S12, controlling deposition of ink droplets onto the ITM 210 at the imaging 212 station so as to modify a spacing between ink droplets, in response to detected changes in the stretch factor ratio tracked in Step S11.

Figure 11B:
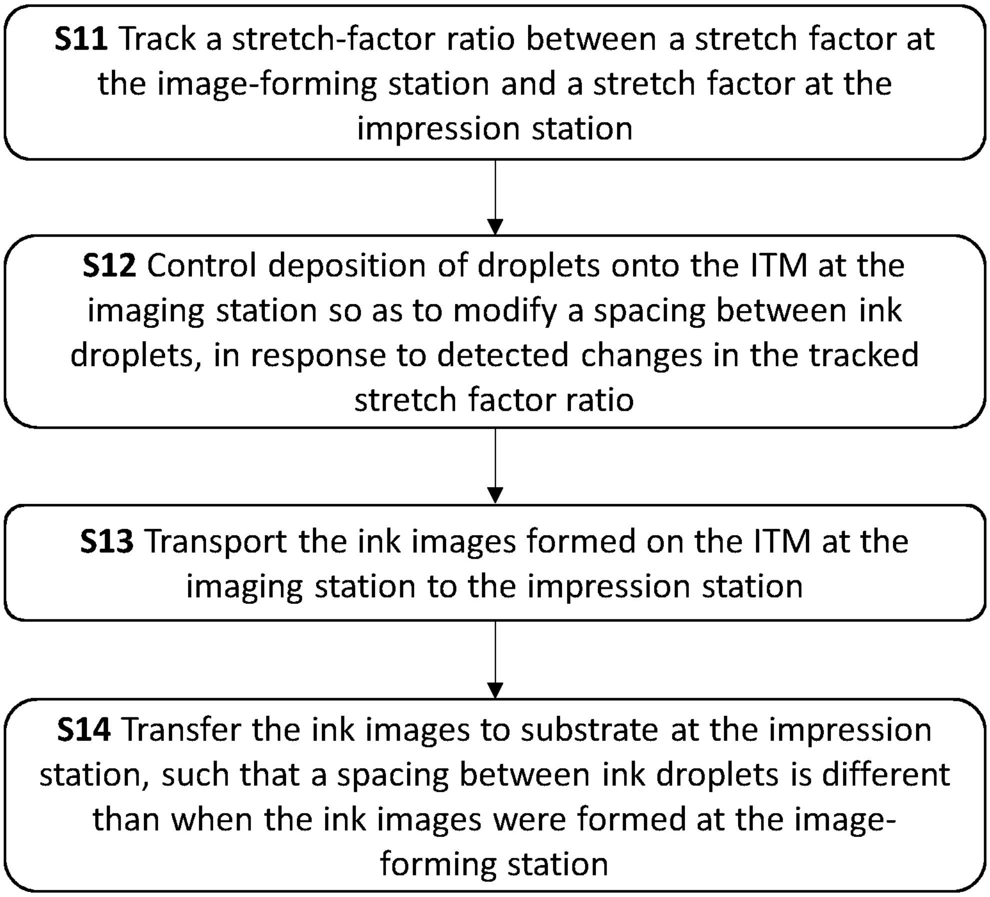

Another method of printing using a printing system 100 is now disclosed, including method steps shown in the flowchart in FIG. 11B. The method can be carried out using a printing system, for example printing system 100 of FIG. 1 which comprises an image-forming station 212 at which ink images are formed by droplet deposition on a rotating flexible ITM 210, and (ii) an impression station 216 downstream of the image-forming station 212 at which the ink images are transferred to substrate 231. The method comprises:

a. Step S11, as described above.

b. Step S12, as described above.

c. Step S13, transporting the ink images formed on the ITM at the image-forming station 212 (in step S12) to the impression station 216.

d. Step S14, transferring the ink images to substrate at the impression station 216, such that a spacing between ink droplets is different than when the ink images were formed at the image-forming station 212. In some embodiments, the inter-droplet spacing when images are transferred to substrate at the impression station 216 is smaller than when the ink images were formed at the image-forming station 212. In some embodiments, when images are transferred to substrate at the impression station 216, the ink droplets deposited at the image-forming station 212 will have substantially been dried and flattened to form a film, or ink residue. on the ITM 210. The ink residue can comprise a colorant such as a pigment or dye. In other words, it can be that there are no longer any ink droplets per se by the time the ink images arrive at the impression station 216. Nonetheless, the distance between visible pixels formed by deposition of one or more ink droplets, can be measured and used as inter-droplet spacing distances. For example, pixels respectively formed at least in part by droplets 311, 312 of FIG. 10 can be used—for example, for calculating stretch factors and ratios—when the inter-pixel distances can be seen and measured. Inter-droplet spacing distance D1 of FIG. 10 is an example of inter-droplet spacing that, as evidenced by Part E of FIG. 10, is retained at the impression station and on printed substrate as inter-pixel spacing. Thus, any reference to inter-droplet spacing at an impression station in this disclosure can be understood as the underlying inter-droplet spacing evidenced by corresponding inter-pixel spacing. On the other hand, intra-pixel inter-droplet spacing at the impression station may not be visibly measurable as greater than zero because of the post-deposition mixing of colors of ink droplets deposited to form a single pixel. A stretch factor $SF_{IMP}$ as applied to intra-pixel spacing can be made equal to 1, and in this case a calculated stretch factor ratio would be equal to the stretch factor at the image-forming station, i.e., SF or $SF(TI_i)$.

To remove any doubt, the expression "spacing between ink droplets in ink images when transferred to substrate at the impression station" should be understood throughout the present disclosure as equivalent to the expression "spacing, when ink images are transferred to substrate at the impression station, between pixels comprising the residue of substantially dried ink droplets". "Spacing," in embodiments, can mean centerline-to-centerline. "Ink droplets" in the context of the impression station, in the context of transferring ink images to substrate at the impression station, should be understood to mean the residue or dried residue of the ink droplets.

Figure 12:
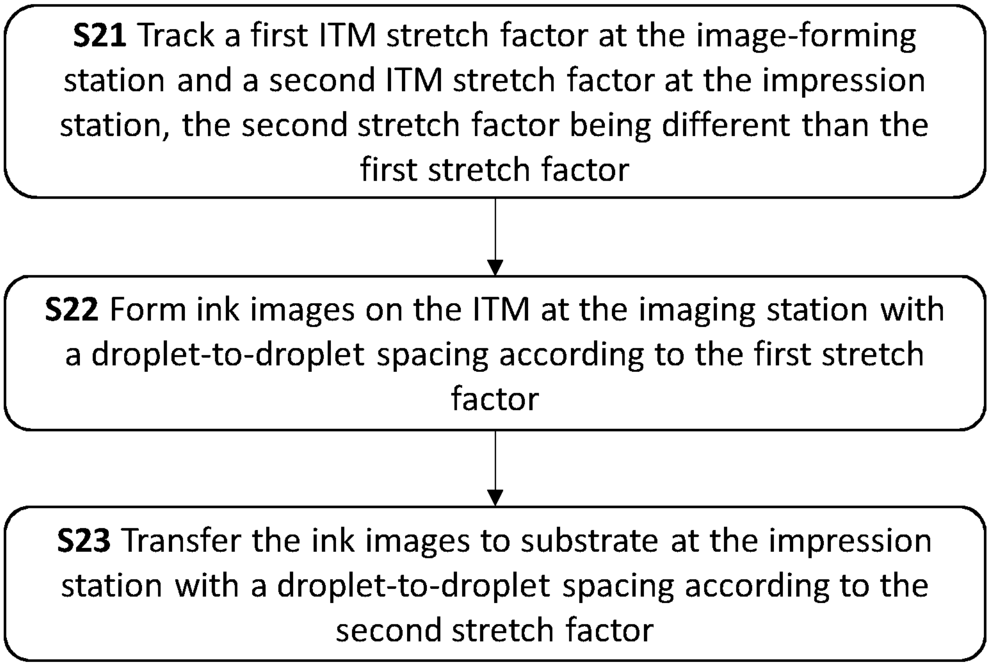

Another method of printing using a printing system 100 is disclosed, including method steps shown in the flowchart in FIG. 12. The method can be carried out using a printing system, for example printing system 100 of FIG. 1, which comprises an image-forming station 212 at which ink images are formed by droplet deposition on a rotating flexible ITM 210, and an impression station 216 downstream of the image-forming station 212 at which the ink images are transferred to substrate 231. The method comprises:

a. Step S21, tracking a first ITM stretch factor SF or SF($TI_i$) at the image-forming station 212 and a second ITM stretch factor $SF_{IMP}$ at the impression station 216, the second stretch factor $SF_{IMP}$ being different than the first stretch factor SF or SF($TI_i$).
b. Step S22, forming ink images on the ITM 210 at the imaging station 212 with a droplet-to-droplet spacing according to the first stretch factor SF or SF($TI_i$).
c. Step S23, transferring the ink images to substrate at the impression station 216 with a droplet-to-droplet spacing according to the second stretch factor $SF_{IMP}$. The droplet-to-droplet spacing according to the second stretch factor $SF_{IMP}$ can be evidenced by visible inter-pixel spacing D1 at the impression station 216, as discussed earlier with respect to Step S14. In some embodiments, the second stretch factor $SF_{IMP}$ is smaller than the first stretch factor SF or SF($TI_i$).

In some embodiments of the method, the image-forming station 212 comprises a plurality of print bars 222, and tracking a first stretch factor SF or SF($TI_i$) at the image-forming station 212 includes tracking a respective first stretch factor SF or SF($TI_i$) at each print bar $\mathbf{222}_j$ of print bars $\mathbf{222}_1$ . . . $\mathbf{222}_N$ of the image-forming station 212. In addition, forming the ink images at the image-forming station 212 with a droplet-to-droplet spacing according to the first stretch factor SF or SF($TI_i$) includes forming the ink images at each print bar $\mathbf{222}_j$ of print bars $\mathbf{222}_1$ . . . $\mathbf{222}_N$ of the image-forming station 212 with a droplet-to-droplet spacing according to the first stretch factor SF or SF($TI_i$) corresponding to the respective print bar $\mathbf{222}_j$.

Figure 13:
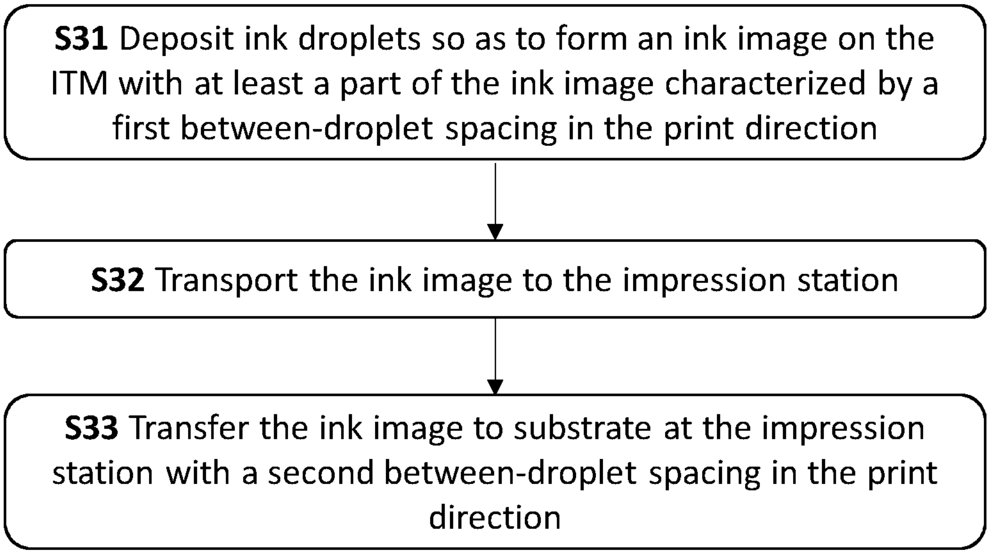

Yet another method of printing using a printing system 100 is now disclosed, including method steps shown in the flowchart in FIG. 13. The method can be carried out using a printing system, for example printing system 100 of FIG. 1 which comprises an ITM 210 comprising a flexible endless belt mounted over a plurality of guide rollers 232 ($\mathbf{232}_1$ . . . $\mathbf{232}_N$), 260, and an image-forming station 212 comprising a print bar 222 disposed over a surface of the ITM 210, the print bar 222 configured to form ink images upon a surface of the ITM by droplet deposition. The suitable printing system 100 additionally comprises a conveyer for driving rotation of the ITM in a print direction (arrow 2012 in FIG. 1) to transport the ink images towards an impression station 216 where they are transferred to substrate 231. The conveyor can include one or more electric motors (not shown) and one or more drive rollers 242, 240, 253, 250. The method comprises:

a. Step S31, depositing ink droplets so as to form an ink image on the ITM 210 with at least a part of the ink image characterized by a first between-droplet spacing in the print direction 2012. In some embodiments, the first between-droplet spacing in the print direction 2012 changes from time to time.
b. Step S32, transporting the ink image to the impression station 216.
c. Step S33, transferring the ink image to substrate at the impression station 216 with a second between-droplet spacing in the print direction.

According to the method, the first between-droplet spacing in the print direction 2012 is in accordance with an observed or calculated stretching of the ITM 210 at the print bar 222. In some embodiments of the method, the second between-droplet spacing is smaller than the first between-droplet spacing.

Figure 14:
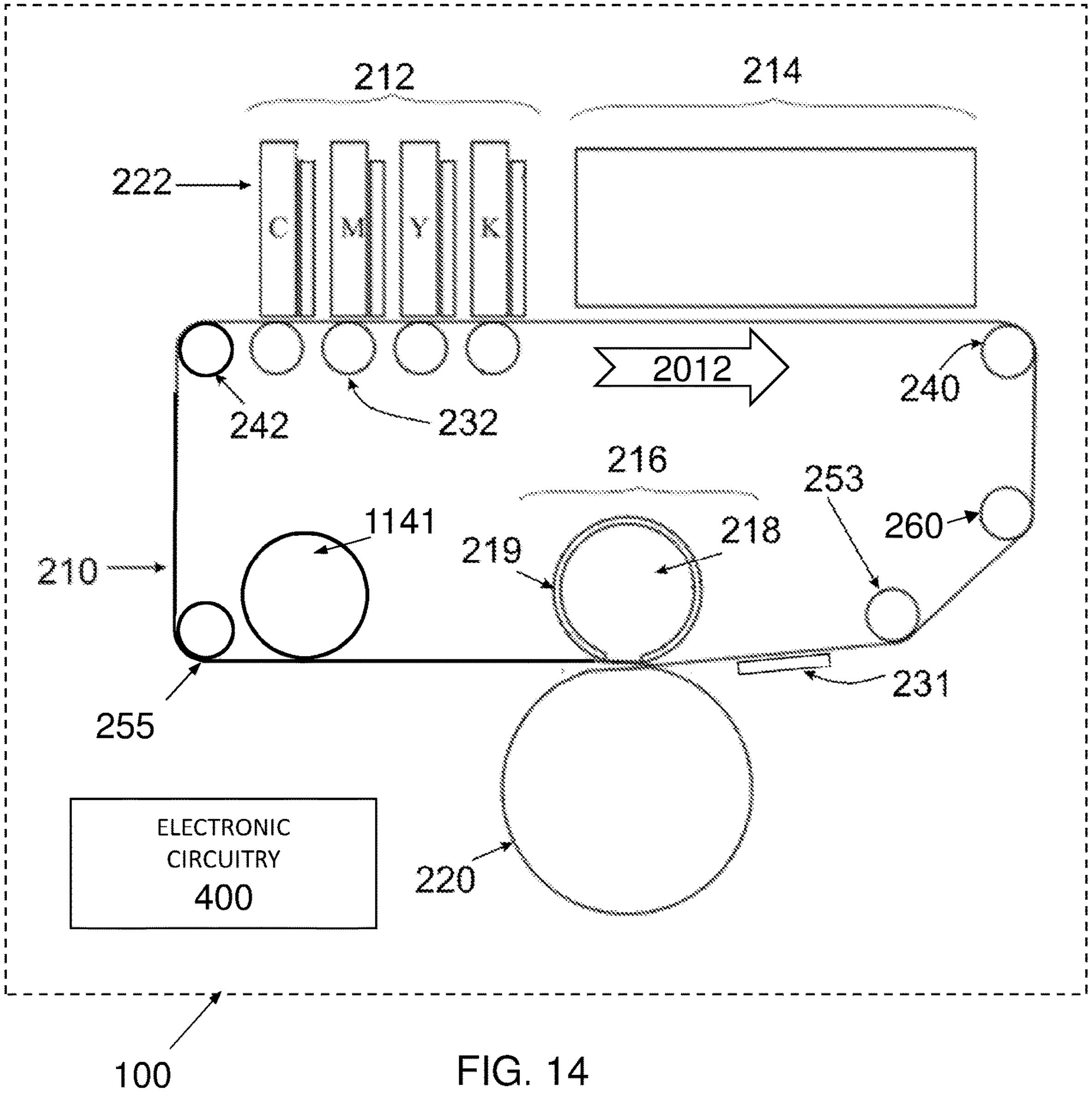
FIG. 14 is an elevation-view illustration of a printing system according to embodiments.

Embodiments of a printing system 100 are illustrated in FIG. 14.

According to some embodiments, a printing system 100 comprises a flexible ITM 210 disposed around a plurality of guide rollers 232 ($\mathbf{232}_1$ . . . $\mathbf{232}_N$), 260 including upstream and downstream guide rollers $\mathbf{232}_j$, $\mathbf{232}_{j+1}$ at which respective upstream and downstream encoders $\mathbf{250}_j$, $\mathbf{250}_{j+1}$ are installed. The printing system 100 additionally comprises an image-forming station 212 at which ink images are formed by droplet deposition, the image-forming station 212 comprising upstream and downstream print bars $\mathbf{222}_j$, $\mathbf{222}_{j+1}$ disposed over the ITM 210 and respectively aligned with the upstream and downstream guide rollers $\mathbf{232}_j$, $\mathbf{232}_{j+1}$, the upstream and downstream print bars $\mathbf{222}_j$, $\mathbf{222}_{j+1}$ having a fixed physical distance $X_{FIX}$ therebetween and defining a reference portion RF of the ITM 210. The printing system additionally comprises electronic circuitry 400 for controlling the spacing between ink droplets deposited by the downstream print bar $\mathbf{222}_{j+1}$ onto the ITM 210 according to a calculated time-interval-specific stretch factor SF($TI_i$) so as to compensate for the stretching of the reference portion RF of the ITM 210. Methods for derivation or calculation of the time-interval-specific stretch factor SF($TI_i$) for each time interval $TI_i$ (one of M consecutive preset divisions of a predetermined time period TT) are disclosed above.

According to some embodiments, a printing system 100 comprises an image-forming station 212 at which ink images are formed by droplet deposition on a rotating flexible ITM 210, an impression station 216 downstream of the image-forming station 212, and electronic circuitry configured to (a) track a stretch-factor ratio between a stretch factor SF or SF($TI_i$) at the image-forming station 212 and a stretch factor $SF_{IMP}$ at the impression station 216, and (b) control deposition of droplets onto the ITM 210 at the imaging station 212 in accordance with detected changes in the tracked stretch factor ratio, so as to modify a spacing between ink droplets in ink images formed on the ITM 210 at the imaging station 212. The electronic circuitry 400 can be configured to ensure that when modifying a spacing between ink droplets in ink images formed on the ITM 210 at the imaging station 212, the spacing is larger than a spacing between the droplets in the ink images when they are transferred to substrate 231 at the impression station 216.

According to some embodiments, a printing system comprises an image-forming station 212 at which ink images are formed by droplet deposition on a rotating flexible ITM 210, electronic circuitry 400 configured to track a first stretch factor SF or SF($TI_i$) at the image-forming station 212 and a second ITM stretch factor $SF_{IMP}$ at an impression station 216 downstream of the image-forming station 212, and to control deposition of droplets onto the ITM 210 at the imaging station 212 so as to modify a spacing between ink droplets in accordance with the first stretch factor SF or SF($TI_i$). The printing system 100 also comprises the impression station 216, at which the ink images are transferred to substrate with a spacing between ink droplets in accordance with the second stretch factor $SF_{IMP}$. The second stretch factor $SF_{IMP}$ can be smaller than the first stretch factor SF or SF($TI_i$).

According to some embodiments, a printing system 100 comprises a flexible ITM 210 mounted over a plurality of guide rollers 232 ($\mathbf{232}_1$ . . . $\mathbf{232}_N$), 260 and rotating in a print direction 1200, an image-forming station 212 comprising a print bar 222 disposed over a surface of the ITM 210, the print bar 222 configured to deposit droplets upon a surface of the ITM 210 so as to form ink images characterized at least in part by a first between-droplet spacing in the print direction 1200 which is selected in accordance with an observed or calculated stretching of the ITM 210 at the print bar, and a conveyer for driving rotation of the ITM 210 in a print direction 1200 to transport the ink images towards an impression station 216 where they are transferred to substrate 231 with a second between-droplet spacing in the print direction 1200. The conveyor can include one or more electric motors (not shown) and one or more drive rollers 242, 240, 253, 250. In some embodiments, the second between-droplet spacing is smaller than the first between-droplet spacing.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

The invention claimed is:

1. A printing system comprising:

a. an image-forming station at which ink images are formed by droplet deposition on a rotating flexible intermediate transfer member (ITM);

b. an impression station downstream of the image-forming station, at which the ink images are transferred to substrate; and c. electronic circuitry configured to track a stretch-factor ratio between a measured or estimated local stretch factor of the ITM at the image-forming station and a measured or estimated local stretch factor of the ITM at the impression station, and, in response to and in accordance with detected changes in the tracked stretch factor ratio, control deposition of droplets onto the ITM at the imaging station so as to modify a spacing between ink droplets in ink images formed on the ITM at the imaging station.

2. The printing system of claim 1, wherein the electronic circuitry is configured such that modifying of a spacing between ink droplets in ink images formed on the ITM at the imaging station is such that the spacing between ink droplets in ink images formed on the ITM is larger than a spacing between the droplets in the ink images when transferred to substrate at the impression station.

3. The printing system of claim 1, configured such that the ink images are transferred to substrate at the impression station such that a spacing between ink droplets in ink images when transferred to substrate at the impression station is different from the spacing between the respective ink droplets when the ink images were formed at the image-forming station.

4. The printing system of claim 1, wherein the electronic circuitry is configured such that modifying of a spacing between ink droplets in ink images formed on the ITM at the imaging station is such that the spacing between ink droplets in ink images formed on the ITM is smaller than a spacing between the droplets in the ink images when transferred to substrate at the impression station.

5. The printing system of claim 1, wherein (i) the image-forming station comprises a plurality of print bars, and (ii) the electronic circuitry is configured such that the tracking of the stretch-factor ratio between the measured or estimated local stretch factor of the ITM at the image-forming station and the measured or estimated local stretch factor of the ITM at the impression station includes tracking a respective stretch-factor ratio between a measured or estimated local stretch factor of the ITM at each print bar of the image-forming station and a measured or estimated local stretch factor of the ITM at the impression station.

6. A printing system comprising:

a. an image-forming station at which ink images are formed by droplet deposition on a rotating flexible intermediate transfer member (ITM);

b. electronic circuitry configured to track a first ITM stretch factor at the image-forming station and a second ITM stretch factor at an impression station downstream of the image-forming station at which the ink images are transferred to substrate, and to control deposition of droplets onto the ITM at the imaging station so as to modify a spacing between ink droplets in accordance with the first ITM stretch factor; and c. the impression station, at which the ink images are transferred to substrate with a spacing between ink droplets in accordance with the second stretch factor.

7. The printing system of claim 6, wherein the second stretch factor is smaller than the first ITM stretch factor.

8. A printing system comprising:

a. an intermediate transfer member (ITM) comprising a flexible endless belt mounted over a plurality of guide rollers and rotating in a print direction;

b. an image-forming station comprising a print bar disposed over a surface of the ITM, the print bar configured to deposit droplets upon a surface of the ITM so as to form ink images characterized at least in part by a first between-droplet spacing in the print direction which is selected in accordance with in accordance with data associated with stretching of the ITM at the print bar; and c. a conveyer for driving rotation of the ITM in a print direction to transport the ink images towards an impression station where they are transferred to substrate with a second between-droplet spacing in the print direction, wherein the second between-droplet spacing is smaller than the first between-droplet spacing and wherein the first between-droplet spacing in the print direction is further selected in accordance with a sub-unity ratio between:

(i) the second between-droplet spacing, and (ii) the first between-droplet spacing, said sub-unity ratio describing an extent-of-decrease of local-ITM stretch between the image-forming and impression stations.

* * * * *